United States Patent [19]
Teutsch et al.

[15] 3,665,017
[45] May 23, 1972

[54] PROCESS FOR PREPARATION OF 6-AZIDO-4, 6-BIS-DEHYDRO-STEROIDS

[72] Inventors: George J. Teutsch, Nancy, France; Elliot L. Shapiro, Cedar Grove, N.J.

[73] Assignee: Schering Corporation, Bloomfield, N.J.

[22] Filed: July 24, 1970

[21] Appl. No.: 58,162

[52] U.S. Cl. ............. 260/349, 260/239.55 D, 260/397.4, 260/397.2, 260/397.3, 260/397.45, 260/397.47
[51] Int. Cl. ....................................... C07c 173/00
[58] Field of Search ................................. 260/349, 397.4

Primary Examiner—Elbert L. Roberts
Attorney—Stephen B. Coan and Mary S. King

[57] ABSTRACT

6-Azido-4,6-bis-dehydro-steroids are prepared by treating a 6β-azido-7α-acyloxy-4-dehydro-steroid which is saturated at C–1 and C–2, with a tetraalkylammonium halide in an aprotic solvent.

Preferred species include the preparation of 6-azido-4,6-pregnadienes of the corticoid and progesterone series by treatment of a 6β-azido-7α-acyloxy-4-pregene of the corticoid or progesterone series which is saturated at C–1 and at C–2 and wherein said 7α-acyloxy is a member selected from the group consisting of 7α-lower alkanoyloxy and 7α-hydrocarbonsulfonyloxy having up to seven carbon atoms with a tetraalkylammonium halide in an aprotic solvent.

6-Azido-6-dehydrocortisone acetate having enhanced anti-inflammatory activity is prepared by treating a member selected from the group consisting of 6β-azido-7αacetoxy-4-pregnene-17α,21-diol-3,11,20-trione 21-acetate and 6β-azido-7αmethanesulfonyloxy-4-pregnene-17α,21-diol-3,11,20-trione 21-acetate with tetramethylammoniumfluoride in acetonitrile.

10 Claims, No Drawings

PROCESS FOR PREPARATION OF 6-AZIDO-4, 6-BIS-DEHYDRO-STEROIDS

FIELD OF INVENTION

This invention relates to a novel process for the preparation of compositions of matter classified in the field of chemistry a 6-azido-4,6-bis-dehydro-steroids.

DESCRIPTION OF THE PRIOR ART

Heretofore it has been unknown to deacyloxylate a 6-substituted-7α-acyloxy-4-dehydro-steroid by means of a tetraalkylammonium halide to produce a 6-substituted-4,6-bis-dehydro-steroid. The present invention provides a method for preparing a novel class of steroids, i.e. 6-azido-4,6-bis-dehydro-steroids, useful as therapeutic agents and as intermediates, by reaction of a 6β-azido-7α-acyloxy-4-dehydro-steroid with a tetraalkylammonium halide.

SUMMARY OF INVENTION

The invention sought to be patented resides in the concept of a process for the preparation of novel 6-azido-4,6-bis-dehydro-steroids having pharmacological activity and/or being useful as intermediates which comprises treating a 6β-azido-7α-acyloxy-4-dehydro-steroid with a tetraalkylammonium halide (preferably tetramethylammonium fluoride) in an aprotic solvent.

Preferred species of our invention include the process of preparing therapeutically valuable 21-unsubstituted and 21-oxygenated-6-azido-4,6-pregnadienes by treatment of a 6β-azido-7α-acyloxy-4-pregnene unsubstituted at C–1 and C–2 wherein said 7α-acyloxy is a member selected from the group consisting of 7α-lower alkanoyloxy and 7α-hydrocarbonsulfonyloxy having up to seven carbon atoms, with a tetraalkylammonium halide (preferably tetramethylammonium fluoride) in an aprotic solvent (usually acetonitrile or dimethylformamide).

GENERAL DESCRIPTION OF THE PROCESS OF THIS INVENTION

The manner of carrying out the tangible embodiment of the process aspect of this invention is generally described hereinbelow so as to enable one skilled in the art to make and use the same.

According to our process, a 6β-azido-7α-acyloxy-4-dehydro-steroid which is saturated at C–1 and C–2 is treated with a tetraalkylammonium halide (preferably tetramethylammonium fluoride) in an aprotic solvent (preferably acetonitrile or dimethylformamide) whereby is formed a 6-azido-4,6-bis-dehydro-steroid having pharmacological activity or being useful as an intermediate.

Our process is usually carried out in an aprotic solvent at temperatures in the range of from about 0° C. to about 80° C., preferably between 20° C. to about 60° C.

Although anhydrous conditions are usually employed in our deacylating process, water may be present in small amounts and there will be formed the desired 6-azido-4,6-bis-dehydro-steroid. Thus, for example, treatment of 6β-azido-7α-acetoxy-4-pregnene-17α,21-diol-3,11,20-trione 21-acetate or of 6-azido-7α,17α-diacetoxy-16-methylene-4-pregnene-3,20-dione in acetonitrile with tetramethylammonium fluoride pentahydrate yields 6-azido-4,6-pregnadiene-17α,21-diol-3,11,20-trione-21-acetate and 6-azido-16-methylene-17α-acetoxy-4,6-pregnadiene-3,20-dione, respectively, in good yields.

Aprotic solvents suitable for use in our process include dimethylsulfoxide, dimethylacetamide, dioxane, tetrahydrofuran, and preferably acetonitrile or dimethylformamide.

The tetraalkylammonium halide reagents necessary to our process are known in the art. In our process, we have found it most convenient to use tetramethylammonium chloride, or, preferably, tetramethylammonium fluoride, since they are commercially available and excellent product yields are obtained thereby. When utilizing the commercially available tetramethylammonium fluoride pentahydrate as reagent, usually the water of hydration is removed therefrom by azeotropic distillation with acetonitrile although the reaction will proceed when the pentahydrate is used as reagent. When preparing the anhydrous form of the tetramethylammonium fluoride reagent, the azeotropic distillation is continued until the reagent is a solid at 50° C., at which point it is most suitable for use as a deacyloxylating reagent to convert a 6β-azido-7α-acyloxy-4-dehydro-steroid which is unsubstituted at C–1 and C–2 to a 6-azido-4,6-bis-dehydro-steroid.

The tetraalkylammonium halide reagents have limited solubility in the aprotic solvents utilized in this process; therefore, it is preferable to stir the reaction mixture when deacyloxylating at C–7(6). The reaction will proceed without stirring, however, with the tetraalkylammonium halide dissolving as the reaction proceeds.

As used in the specification and claims of this application, the term "acyl" denotes a radical derived from an organic or inorganic acid by removal of the hydroxyl group, e.g. acetyl is the acyl radical of acetic acid present in a 7α-acetate ester, methanesulfonyl is the acyl radical of methanesulfonic acid present in a 7α-methanesulfonate ester, benzoyl is the acyl radical of benzoic acid, present in a 7α-benzoate ester, and phosphono is the acyl radical of phosphoric acid present in a 7α-phosphate ester.

According to our inventive concept, any acyl radical present in a 6β-azido-7α-acyloxy-4-dehydro-steroid which is saturated at C–1 and C–2 upon treatment with a tetraalkylammonium halide in an aprotic solvent will deacyloxylate said steroid at C–7(6) to produce a 6-azido-4,6-bis-dehydro-steroid.

The acyl radicals of the requisite 6β-azido-7α-acyloxy-4-dehydro-steroid starting compounds of our invention are contemplated as including those derived from hydrocarbon carboxylic acids having up to 12 carbon atoms and hydrocarbon sulfonic acids having up to 20 carbon atoms wherein said hydrocarbon may be saturated, unsaturated, straight chain or branched chain, aliphatic, cyclic, cyclic-aliphatic, aromatic, aryl-aliphatic or alkyl aromatic, and may be substituted such as by hydroxy, alkoxy containing from one to five carbon atoms, nitro, or by halogen such as fluorine, chlorine or bromine. Typical ester groups present at C–7 in the 6β-azido-7α-acyloxy-4-dehydro-steroid starting compounds of our invention are thus derived from hydrocarbon carboxylic acids such as alkanoic acids exemplified by formic, acetic, propionic, trimethylacetic, butyric, iso-butyric, valeric, iso-valeric, caproic, caprylic, capric, undecylic and lauric acids; substituted alkanoic acids such as phenoxyacetic, trifluoroacetic, and 62-chloropropionic acids; aromatic and substituted aromatic acids including benzoic, toluic, p-chlorobenzoic acids; arylalkanoic acids such as phenylacetic and phenylpropionic acids; unsaturated acids such as acrylic and sorbic acids; and dibasic acids such as succinic, tartaric and phthalic acids. Other typical ester groups at C–7 are those derived from hydrocarbonsulfonic acids including alkylsulfonic acids, e.g. methylsulfonic and ethylsulfonic acids; arylsulfonic acids, e.g. benzenesulfonic and naphthalene-β-sulfonic acids; alkarylsulfonic acids, e.g. para-toluenesulfonic, ortho-toluenesulfonic, meta-toluenesulfonic, 3,4-xylenesulfonic and dodecylbenzenesulfonic acids; and substituted hydrocarbon sulfonic acids such as p-bromobenzenesulfonic, p-chlorobenzenesulfonic, m-chlorobenzenesulfonic, p-nitrobenzenesulfonic, p-methoxybenzenesulfonic, o-dimethylaminobenzenesulfonic, and m(or p)-cyanobenzenesulfonic acids.

Also contemplated as included among the acyloxy radicals present at C–7 of the 6β-azido-7α-acyloxy-4-dehydro-starting steroids of our invention are those derived from inorganic acids, such as phosphoric acid.

We prefer to carry out our process on 6β-azido-7α-acyloxy-4-dehydro-steroids wherein the 7α-acyloxy is derived from a lower alkanoic acid (i.e. having up to eight carbon atoms) or from a hydrocarbonsulfonic acid having up to seven carbon atoms (preferably methanesulfonic acid and p-toluenesulfonic acid).

Generally, when deacyloxylating a 6 β-azido-7α-acyloxy-4-dehydro-steroid according to our process, the 6β-azido-7α-acyloxy intermediate is added (either in the solid state or in solution) to a solution or suspension of tetraalkylammonium halide (present in quantities ranging from 1.5 to 5 moles per mole of steroid) in an aprotic solvent (of which 1 ml. per 10 mgm. of reagent is generally used). The reaction is stirred or left standing in temperatures ranging between 0° to 80° C. until the deacyloxylation at C–6 (7) is completed as evidenced by thin layer chromatography or by spectroscopic evaluation. (Reaction times usually range from 10 minutes to 48 hours.) The resulting 6-azido-4,6-bis-dehydro-steroid is isolated utilizing known techniques. Usually, the solvent is partially or totally removed in vacuo, then an organic solvent (e.g. methylene chloride, chloroform, ethyl acetate, and the like) is added, the solution poured into water, the layers separated, the organic layer washed with dilute aqueous base (e.g. sodium bicarbonate), dried and evaporated to a residue comprising the desired 6-azido-4,6-bis-dehydro-steroid. Purification is effected by known techniques including chromatography and recrystallization methods.

The process of our invention whereby a 6β-azido-7β-acyloxy-4-dehydro-steroid is deacyloxylated at C–7 (6) is applicable to any steroid possessing a 6β-azido-7α-acyloxy-4-dehydro system and which is saturated at C–1 and C–2. Thus any pregnane, androstane, cholestane, spirostane, ergostane, lanostane, stigmastane, saponin, sapogenin, or bile acid, including their 19-nor analogs, which contains a 6β-azido-7α-acyloxy-4-dehydro system and which is saturated at C–1 and C–2 will, upon treatment with a tetraalkylammonium halide in an aprotic solvent be converted to the corresponding 6-azido-4,6-bis-dehydro derivative. 6β-Azido-7α-acyloxy-derivatives of 4-pregnenes such as cortisone, hydrocortisone, 16-methylene-17α-acetoxy-progesterone, 19-nor-progesterone, and the like are thus converted to the corresponding 6-azido-4,6-pregnadiene. 6β-Azido-7α-acyloxy-derivatives of 4-androstenes such as testosterone, 17α-ethinyl-19-nor testosterone, 4-androstene-3,17-dione are converted to the corresponding 6-azido-4,6-androstadiene.

Advantageously, the process of this invention is carried out under mild conditions at temperatures in the range of from 0° C. to about 80° C. in a media which is close to neutrality, usually being slightly acidic. Our process is of particular value, therefore, when deacyloxylating a 6β-azido-7α-acyloxy-steroid which possesses groupings sensitive to strong acids or strong bases. Thus, a 6β-azido-7α-acyloxy-corticoid possessing the dihydroxyacetone side chain at C–17 or a 6β-azido-7α-acyloxy progesterone having a 17α-acetoxy function, both of which groupings are known to react with strong bases, upon deacyloxylation by our process produces the corresponding 6-azido-6-dehydro-steroid in high yields with a minimum of unwanted side reactions.

Additionally, substitutents present in the 6β-azido-7α-acyloxy-4-dehydro-starting steroid of our process usually remain unchanged under the conditions of our process. Thus, by way of example, the 6β-azido-7α-acyloxy-starting steroids of our invention may be substituted at C–1 by a lower alkyl group; at C–9 by halogen, at C–11 by oxygen, hydroxyl, and halogen; at C–16 by lower alkyl, lower alkylidene or lower halogeno-alkylidene, halogen, hydroxy or alkanoyloxy; and at C–17 may have a 17-keto, 17β-hydroxyl, 17α-lower alkyl-17β-hydroxy, 17α-alkinyl-17β-hydroxy-, 17α-halogenalkinyl-17β-hydroxy-groupings as well as esters and derivatives of the foregoing, and also may have a sapogenin, cholestane, corticoid progesterone or 17α-substituted progesterone side chain.

The 6β-azido-7α-acyloxy-4-dehydro-starting steroids of our process are conveniently prepared from the corresponding 6,7-unsubstituted-4,6-bis-dehydro-steroids utilizing known techniques such as described in the co-pending applications, Ser. Nos. 59,367 and 58,163, filed July 29, 1970 and July 24, 1970, respectively, of Elliot L. Shapiro, George J. Teutsch, and Hershel L. Herzog for 6-Azido-21-Oxygenated-Steroids of the Pregnane Series, Methods for their Manufacture and Intermediates Produced Thereby and 6-Azido-6-Dehydro Steroids of the Progesterone Series, Methods for their Manufacture and Intermediates Produced Thereby, respectively. A convenient method is to first introduce a 6α,7α-oxido function, into a 3-keto-4,6-diene (which preferably has present therein all the substituents desired in the 6β-azido-7α-acyloxy-4-dehydro-steroid being prepared) (e.g. 6-dehydro-hydrocortisone 21-acetate) by reaction thereof with a per-acid in a non-reactive organic solvent, e.g. with reagent-solvent combinations such as meta-chloroperbenzoic acid in acetone, meta-chloroperbenzoic acid in methylene chloride-tert-butanol, or with mono-perphthalic acid in chloroform. Subsequent treatment of the 6 α,7α-oxide-4-dehydro-steroid thereby produced (e.g., 6α,7α-oxido-4-pregnene-11β, 17α,21-triol-3,20-dione 21-acetate) with an alkali metal azide (preferably sodium azide) in an aqueous, inert organic solvent forms a 6β-azido-7α-hydroxy-4-dehydro-steroid (e.g. 6β-azido-7α-hydroxy-4-pregnene-11β,17α,21-triol,3,20-dione 21-acetate) which, upon esterification according to known procedures (e.g. utilizing acetic anhydride in pyridine or methanesulfonyl chloride in pyridine) yields the desired 6β-azido-7α-acyloxy-4-dehydro-starting steroid of our process (e.g. 6β-azido-7α-acetoxy-4-pregnene-11β,17α,21-triol-3,20-dione 21-acetate or 6β-azido-7α-methanesulfonyloxy-4-pregnene-11β,17α,21-triol-3,20-dione 21-acetate, respectively).

As disclosed hereinabove, when preparing the 6β-azido-7α-acyloxy-4-dehydro-starting steroids, it is preferable that all the substituents desired therein be present in the 3-keto-4,6-diene starting compounds. Alternatively, substituents may be introduced into the 6β-azido-7α-acyloxy-4-dehydro-steroid molecule utilizing procedures known in the art. Thus, 6β-azido-7α-acyloxy-4-dehydro-steroids substituted at C–9 and C–11 are prepared from the corresponding 9(11)-dehydro intermediate (e.g. 6β-azido-7α-acetoxy-4,9(11)-pregnadiene-17α,21-diol-3,20-dione 21-acetate) by known halogenating methods (e.g. chlorine in carbon tetrachloride) to produce 9,11-dihalogeno derivatives (e.g. 6β-azido-7α-acetoxy-9α,11β-dichloro-4-pregnene-17α,21-diol-3,20-dione 21-acetate) or by treatment with N-bromoacetamide in perchloric acid to form a 9α-bromo-11β-hydroxy derivative (e.g. 6β-azido-7α-acetoxy-9α-bromo-4-pregnene-11β,17α,21-triol-3,20-dione 21-acetate), which in turn upon treatment with potassium acetate in acetone will form the corresponding 9β,11β-oxido derivative which upon treatment with a hydrogen halide in an organic solvent (e.g. hydrogen fluoride in chloroform) forms the corresponding 9,11-halohydrin (e.g. 6β-azido-7α-acetoxy-9α-fluoro-4-pregnene-11β,17α,21-triol-3,20-dione 21-acetate).

Preferred species of our process include the process of preparing pharmacologically active 6-azido-4,6-pregnadienes of the corticoid and progesterone series.

Included among the 6-azido-4,6-pregnadienes of the corticoid series prepared by our process are 6-azido-21-oxygenated-4,6- pregnadiene-3,20-diones of the following formula I:

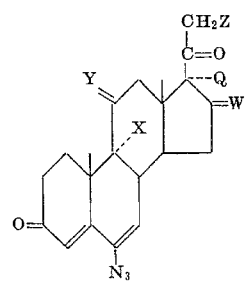

wherein

Q is a member selected from the group consisting of hydrogen, hydroxy, and OR, R being an acyl radical of a hydrocarbon carboxylic acid having up to 12 carbon atoms;

W is a member selected from the group consisting of hydrogen (H,α-alkyl), (H,β-alkyl), (H,α-OH), (H,αOR') wherein R' is an acyl radical of a hydrocarbon carboxylic acid having up to 12 carbon atoms, =CHT wherein T is a member selected from the group consisting of hydrogen, alkyl, fluorine and chlorine, and W taken together with Q when Q is hydroxy and W is (H,α-hydroxy), the 16α,17α-alkylidene derivatives thereof;

X is a member selected from the group consisting of hydrogen and halogen having an atomic weight less than 100;

Y is a member selected from the group consisting of hydrogen, oxygen, (H,βOH), and, provided X is halogen, (H,β-halogen of atomic weight less than 100);

Z is a member selected from the group consisting of hydroxy and OR'' wherein R'' is an acyl radical of an acid selected from the group consisting of a hydrocarbon carboxylic acid having up to 12 carbon atoms, phosphoric acid and the mono- and di-alkali metal and alkaline earth metal salts thereof, and Z taken together with Q when both Q and Z are hydroxy, the 17α,21-alkylidene derivatives thereof.

The alkyl groups included within the definition of the substituents W and T are preferably lower alkyl groups, i.e. radicals having usually up to four carbon atoms such as methyl, ethyl, n-propyl, iso-propyl, sec.-butyl, and tert.-butyl, although higher homologs such as pentyl and hexyl come within the scope of this invention.

The alkylidene groups of the compounds of above formula I are preferably lower alkylidenes, i.e. hydrocarbon radicals having preferably up to four carbon atoms and having a terminal double bond, including radicals such as methylene, ethylidene, n-propylidene, iso-propylidene, n-butylidene, sec.-butylidene, and the like. The 16-lower alkylidene derivatives of this invention (i.e. when W in above formula I is =CHT) are double bonded to the D-ring at C–16. The 16α,17α-alkylidenedioxy derivatives and the 17α,21-alkylidenedioxy derivatives have the alkylidene terminal bonds attached to different oxygen atoms, i.e. to the oxygens at C–16 and C–17 in the case of the 16α,17α-alkylidenedioxy derivatives, or to the oxygens at C–17 and C–21 in the case of the 17α,21-alkylidenedioxy derivatives.

The compounds of formula I are conveniently prepared by our process by treating the corresponding 6β-azido-7α-acyloxy-6,7-dihydro analog with a tetraalkylammonium halide (usually tetramethylammonium fluoride) in an aprotic solvent (preferably acetonitrile or dimethylformamide). The thus prepared 6-azido-21-oxygenated compounds of formula I wherein Z is hydroxy, acyloxy, or together with Q at C–17 is a 17α,21-alkylidenedioxy, possess corticoid properties. Of these, the 6-azido-pregnanes unsubstituted at C–9 and C–11, i.e. those wherein X and Y are each hydrogen, e.g. 6-azido-16-W-17α-Q-4-pregnene-21-ol-3,20-diones of formula I possess mineralo-corticoid properties and, as such, are useful in the treatment of conditions requiring retention of sodium, e.g. adrenal insufficiency (i.e. Addison's disease) and salt losing syndromes.

Those 6-azido-21-oxygenated-4-pregnene-3,20-diones of formula I which have a halogen or an oxygen function at C–11 possess glucocorticoid activity and are particularly valuable as anti-inflammatory agents. Of these, preferred species are 6-dehydro-11,17-bis-oxygenated derivatives, particularly 6-azido-4,6-pregnadiene-17,21-diol-3,20-diones of formula I wherein Y is (H,β-OH) or oxygen analogs thereof, and their ester and 17,21-alkylidene derivatives, which possess enhanced anti-inflammatory activity.

Illustrative of the pharmacologically active 6-azido-4,6-pregnadienes of formula I which are prepared by our process are the following:

6-Azido-6-dehydrocortisone (i.e. 6-azido-4,6-pregnadiene-17α,21-diol-3,11,20-trione, a 6-dehydro compound of formula I wherein Q and Z are hydroxyl, Y is keto, and W and X are hydrogen) and the 21-acetate; 17-valerate; 17,21-dipropionate, and 17,21-iso-propylidene derivative thereof;

6-Azido-6-dehydrohydrocortisone (i.e. 6-azido-4,6-pregnadiene-11β,17α,21triol-3,20-dione) and the 21-acetate; 17-valerate; 17,21-dipropionate, and the 17,21-isopropylidene-derivative thereof;

6-Azido-9α-fluoro-4,6-pregnadiene-17α,21-diol-3,11,20-trione,

6-Azido-9α-fluoro-4,6-pregnadiene-11β,17α,21-triol-3,20-dione,

6-Azido-16-methylene-4,6-pregnadiene-17α,21-diol-3,11,20-trione,

6-Azido-16-methylene-4,6-pregnadiene-11β,17α,21-triol-3,20-dione,

6-Azido-9α-fluoro-16-methylene-4,6-pregnadiene-17α,21-diol-3,11,20-trione,

6-Azido-9α-fluoro-16-methylene-4,6-pregnadiene-11β,17α,213,20-dione,

6-Azido-16α-methyl-4,6-pregnadiene-17α,21-diol-3,11,20-trione,

6-Azido-16β-methyl-4,6-pregnadiene-17α,21-diol-3,11,20-trione,

6-Azido-16α-methyl-4,6-pregnadiene-11β,17α,21-triol-3,20-dione,

6-Azido-16β-methyl-4,6-pregnadiene-11β,17α,21-triol-3,20-dione,

6-Azido-9α-fluoro-16α-methyl-4,6-pregnadiene-17α,21-diol-3,11,20-trione,

6-Azido-9α-fluoro-16β-methyl-4,6-pregnadiene-17α,21-diol-3,11,20-trione,

6-Azido-9α-fluoro-16α-methyl-4,6-pregnadiene-11β,17α,21-triol-3,20-dione,

6-Azido-9α-fluoro-16β-methyl-4,6-pregnadiene-11β,17α,21-triol-3,20-dione,

6-Azido-16α-hydroxy-4,6-pregnadiene-17α,21-diol-3,11,20-trione, the 16,21-diacetate ester thereof, and the 16α,17α6-Azido-16α-hydroxy-4,6-pregnadiene-11β,17α,21-triol-3,20-dione, the 16,21-diacetate ester thereof, and the 16α,17α6-Azido-9α-fluoro-16α-hydroxy-4,6-pregnadiene-17α,21-diol-3,11,20-trione, the 16,21-diacetate ester thereof, and the 16α,17α6-Azido-9α-fluro-16α-hydroxy-4,6-pregnadiene-11β,17α,21-triol-3,20-dione, the 16,21-diacetate ester thereof, and the 16α,17α-iso-propylidene thereof.

The enhanced anti-inflammatory activity of 6-azido-4,6-bis-dehydropregnanes of formula I oxygenated at C–11, C–17 and C–21 are demonstrated by pharmacological tests in animals. Thus, for example, 6-azido-6-dehydrocortisone 21-acetate, when tested for anti-inflammatory activity by the well known systemic pouch test, exhibits anti-inflammatory activity greater than 1.5 times that of prednisolone acetate thus demonstrating 6-azido-6-dehydrocortisone 21-acetate about 15 times more active as an anti-inflammatory agent in the systemic pouch test than the corresponding 6-unsubstituted analog, i.e. 6-dehydrocortisone 21-acetate.

In addition to the foregoing, 6-azido-9α,11β-dihalogeno-4,6-pregnadiene-17α,21-bis-oxygenated-compounds of formula I (especially the 17-mono and 17,21-di-lower alkanoate esters thereof) wherein X and Y are halogen, (preferably those wherein the C–11 halogen (Y) is at least as electronegative as the C–9 halogen (X)), also possess superior anti-inflammatory activity being useful as topical anti-inflammatory agents. Particularly valuable 6-azido-9α,11β-dihalogeno-21-oxygenated-4,6-pregnadiene-3,20-diones include compounds such as:

6-Azido-9α,11β-dichloro-4,6-pregnadiene-17α,21-diol-3,20-dione, the 21-acetate thereof, the 17-mono-valerate thereof, the 17α,21-di-propionate thereof, and the 17,21-iso-propylidene derivative thereof, 6-Azido-9α,11β-dichloro-16α-hydroxy-4,6-pregnadiene-17α,21-diol-3,20-dione, the 16,21-diacetate thereof, and the 16α,17α21-acetate thereof, 6-Azido-9α,11β-dichloro-16α-methyl-4,6-pregnadiene-17α,21-diol-3,20-dione, the 17-propionate and 17,21-dipropionate esters thereof, 6-Azido-9α,11β-dichloro-16β-methyl-4,6-pregnadiene-17α,21-diol-3,20-dione, the 17-propionate and 17,21-dipropionate esters thereof, and 6-Azido-9α,11β-dichloro-16-methylene-4,6-pregnadiene-17α,21-diol-3,20-dione.

Pharmacologically active 6-azido-6-dehydro steroids of the progesterone series which are conveniently prepared by our process include 6-azido-6-dehydroprogesterones of following formula II:

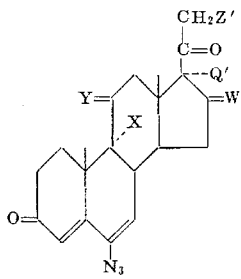

wherein

W, X and Y are as defined herein above for formula I:

Q' is a member selected from the group consisting of hydroxy, and OR, R being an acyl radical of a hydrocarbon carboxylic acid having up to 12 carbon atoms, and hydrogen provided W is hydrogen or (H, lower alkyl); and Z' is a member selected from the groups consisting of hydrogen and halogen (preferably fluorine).

The new compounds defined by formula II possess pharmacological and therapeutic properties and may be used as medicaments in conditions requiring a progestational agent, e.g. in fertility control and in the management of various menstrual disorders. They may be administered via the oral or intramuscular route in a manner similar to that in which known progestational agents, e.g. progesterone, are administered, the dosage depending on the age and size of the patient and in the nature and severity of the ailment being treated. The progestational activity of compounds of formula II is demonstrated in studies in immature rats by the well known Clauberg method via the oral and intramuscular route. For example, in this test, 6-azido-16-methylene-17α-acetoxy-4,6-pregnadiene-3,20-dione is about 20 times as active as progesterone via the intramuscular route.

The 6-azido-6-dehydroprogesterones are also useful in the treatment of disorders requiring anti-androgen therapy such as in the treatment of acne, or benign prostatic hypertrophy. The anti-androgenic activity of compounds of formula II is studied in the intact male immature rat by the test described by R. O. Neri et.al., Eur. J. Pharm. 1, 438–444 (1967) (Section 2.1.2, p. 439). It was demonstrated, for example, that at 10 mgm./kgm doses administered subcutaneously in sesame oil, anti-androgenic activity was exhibited by compounds of formula II, e.g. 6-azido-16-methylene-17α-acetoxy-4,6-pregnadiene-3,20-dione.

6-Azido-6-dehydro-progesterones of formula II which can be prepared from the corresponding 6β-azido-7α-acyloxyprogesterone precursor by reaction with a tetraalkylammonium halide according to our process includes 6-azido-16-lower alkylidene-6-dehydro-progesterones which are substituted at C–17 by a hydroxy group or a lower alkanoyloxy group (i.e. compounds of formula II wherein Q is hydroxy or lower alkanoyloxy and W is =CHT, T being H, lower alkyl, chlorine, fluorine) exemplified by compounds such as:

- 6-Azido-16-methylene-17α-acetoxy-4,6-pregnadiene-3,20-dione,

6-Azido-16-n-butylidene-17α-acetoxy-4,6-pregnadiene-3,20-dione,

6-Azido-16-methylene-17α-propionoxy-4,6-pregnadiene-3,20-dione,

6-Azido-9α,11β-dichloro-16-methylene-17ζ-acetoxy-4,6-pregnadiene-3,20-dione,

6-Azido-9α,11β-dichloro-16-ethylidene-17α-acetoxy-4,6-pregnadiene-3,20-dione,

6-Azido-9α-bromo-11β-fluoro-16-methylene-17α-acetoxy-4,6-pregnadiene-3,20-dione, 6-Azido-9α-fluoro-11β-hydroxy-16-methylene-17α-acetoxy-4,6-pregnadiene-3,20-dione, 6-Azido-9α-fluoro-16-methylene-17α-acetoxy-4,6-pregnadiene-3,11,20-trione, 6-Azido-11β-hydroxy-16-methylene-17α-acetoxy-4,6-pregnadiene-3,20-dione, 6-Azido-16-methylene-17α-acetoxy-4,6-pregnadiene-3,11,20-trione, 6-Azido-16-methylene-17α-acetoxy-21-fluoro-4,6-pregnadiene-3,20-dione, 6-Azido-9α,11β-dichloro-21-fluoro-16-methylene-17-acetoxy-4,6-pregnadiene-3,20-dione, 6-Azido-16-chloromethylene-4,6-pregnadiene-17α-acetoxy-4,6-pregnadiene-3,20-dione, 6-Azido-9α-fluoro-16-chloromethylene-17α-acetoxy-4,6-pregnadiene-11β-ol-3,20-dione, 6-Azido-16-fluoromethylene-17α-acetoxy-4,6-pregnadiene-3,20-dione, 6-Azido-9α-fluoro-16-fluoromethylene-17α-acetoxy-4,6-pregnadiene-11β-ol-3,20-dione, 6-Azido-16-chloromethylene-17α-acetoxy-4,6-pregnadiene-11β-ol-3,20-dione, and the analogous 17α-hydroxy derivatives of the aforelisted compounds.

Included also are 6-azido-16α,17α-dihydroxy-6-dehydroprogesterones of formula II and their 16α,17α-iso-propylidene derivatives exemplified by compounds such as:

6-Azido-16α,17α-dihydroxy-4,6-pregnadiene-3,20-dione and the 16α,17α-iso-propylidene derivative thereof, 6-Azido-9α,11β-dichloro-16α,17α-dihydroxy-4,6-pregnadiene-3,20-dione and the 16α,17α-iso-propylidene derivative thereof, 6-Azido-9α-fluoro-11β,16α,17α-trihydroxy-4,6-pregnadiene-3,20-dione and the 16α,17α-iso-propylidene derivatives thereof; as well as 6-azido-17α-lower alkanoyloxy-6-dehydroprogesterones having a lower alkyl group at C–16 such as:

6-Azido-16β-methyl-17α-acetoxy-4,6-pregnadiene-3,20-dione and the 16α-methyl epimer thereof, 6-Azido-9α-11β-dichloro-16β-methyl-17α-acetoxy-4,6-pregnadiene-3,20-dione and the 16α-methyl epimer thereof, 6-Azido-16β-methyl-17α-acetoxy-4,6-pregnadiene-3,11,20-trione and the 16α-methyl epimer thereof, 6-Azido-16β-methyl-17α-acetoxy-4,6-pregnadiene-11β-ol-3,20-dione and the 16α-methyl epimer thereof, 6-Azido-9α-fluoro-16β-methyl-17ζ-acetoxy-4,6-pregnadiene-3,11,20-trione and the 16α-epimer thereof, 6-Azido-9α-fluoro-11β-hydroxy-16β-methyl-17α-acetoxy-4,6-pregnadiene-3,20-dione and the 16α-methyl epimer thereof, and 6-azido-16β-methyl-17α-acetoxy-21-fluoro-4,6-pregnadiene-3,20-dione and the 16α-methyl epimer thereof.

Also prepared by our process are 6-azido-16-unsubstituted-17α-hydroxy-21-fluoro-6-dehydroprogesterones of formula II and the 16-lower alkyl analogs thereof which have topical antiinflammatory activity such as:

6-Azido-9α,21-difluoro-4,6-pregnadiene-17α-ol-3,11,20-trione and the 16α-methyl and 16β-methyl analogs thereof;

6-Azido-9α,21-difluoro-4,6-pregnadiene-11β,17α-diol-3,20-dione and the 16α-methyl and 16α-methyl analogs thereof;

6-Azido-21-fluoro-4,6-pregnadiene-17α-ol-3,11,20-trione and the 16α-methyl and 16α-methyl analogs thereof;

7-Azido-21-fluoro-4,6-pregnadiene-17α-ol-3,20-dione and the 16α-methyl and 16β-methyl analogs thereof.

In addition to the foregoing are compounds of formula II including 6-azido-6-dehydro-progesterones which are unsubstituted at C-17 and which are either unsubstituted or have a lower alkyl group at C-16. Some typical compounds of this class are 6-azido-4,6-pregnadiene-3,20-dione (i.e. 6-azido-6-dehydro-progesterone) and the 16α-methyl and 16β-methyl homologs thereof:

6-Azido-21-fluoro-4,6-pregnadiene-3,20-dione and the 16α-methyl and 16β-methyl homologs thereof, 6-Azido-4,6-pregnadiene-3,11,20-trione and the 16α-methyl and 16β-methyl homologs thereof, 6-Azido-4,6-pregnadiene-11β-ol-3,20-dione and the 16α-methyl and 16β-methyl homologs thereof, 6-Azido-9α-fluoro-11β-hydroxy-4,6-pregnadiene-3,20-dione and the 16α-methyl and 16β-methyl homologs thereof, 6-Azido-9α,11β-dichloro-4,6-pregnadiene-3,20-dione and the 16α-methyl and 16β-methyl homologs thereof, 6-Azido-9α-bromo-11β-chloro-4,6-pregnadiene-3,20-dione and the 16α-methyl and 16β-methyl homologs thereof, and 6-Azido-9α,11β-dichloro-21-fluoro-4,6-pregnadiene-3,20-dione and the 16α-methyl and 16β-methyl homologs thereof.

Our process also provides a method for the preparation of 66-azido-4,6-androstadienes and 19-nor-analogs thereof such as those defined by following structural formula III:

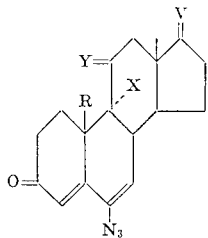

wherein

X is a member selected from the group consisting of hydrogen and halogen;

Y is a member selected from the group consisting of hydrogen, oxygen, (H,βOH), and (H,β-halogen of atomic weight less than 100) provided X is halogen;

R is a member selected from the group consisting of hydrogen and methyl;

V is a member of the group consisting of oxygen, (H,β-OR′), (α-methyl,β-OR′), (α-lower alkinyl,β-OR′) and (α-halogeno-alkinyl,β-OR′) wherein R′ is a member selected from the group consisting of hydrogen and lower alkanoyl.

The 6-azido-4,6-androstadienes of formula III are physiologically active substances, the 6-azido-16α-lower alkinyl- and the 6-azido-17α-lower halogeno-alkinyl-4,6-androstadienes and 19-nor analogs thereof having progestational activity, while the other 6-azido-4,6-androstadienes of formula III possess androgenic activity. The 6-azido-4,6-androstadienes are therefore administered to mammals for the treatment of disorders and the control of physiological processes effected by known androgenic and progestational agents; the 6-azido-4,6-androstadienes being formulated in preparations similar to those used in other known androgenic agents such as testosterone or, in the case of the 6-azido-7α-lower alkinyl-4,6-androstadienes, in preparations similar to those used in other known progestational agents such as progesterone, the concentration and/or dosage being based upon the activity of the particular compound.

Typical 6-azido-4,6-androstadienes of formula III which may be prepared by our process include 6-azido-4,6-androstadiene-3,17-dione, 6-azido-4,6-androstadiene-17β-ol-3-one and the 17-lower alkanoates thereof, 6-azido-17α-methyl-4,6-androstadiene-17β-ol-3-one, 6-azido-17α-ethinyl-4,6-androstadiene-17β-ol-3-one and the 19-nor-analog thereof, and 6-azido-17α-chloroethinyl-4,6-androstadiene-17β-ol-3-one.

In addition to the foregoing, other 6-azido-4,6-bis-dehydro-steroids prepared by our process, such as those of the cholestane and sapogenin series are useful mainly as intermediates in processes involving degradation and/or rearrangement of the side chain at C-17 to produce therapeutically active 6-azido-4,6-bis-dehydro-steroids of the pregnane and androstane series such as those of formulae I, II and III described hereinabove.

The following examples are used for illustrative purposes only and are not to be construed as limiting, there being included in applicants' inventive concept as defined in the appended claims, equivalents to the specific embodiments disclosed herein which are obvious to those skilled in the art.

EXAMPLE 1

6-Azido-4,6-pregnadiene-17α,21-diol-3,11,20-trione 21-acetate (6-Azido-6-dehydrocortisone 21-acetate)

A. 6β-Azido-7α,17α,21-trihydroxy-4-pregnene-3,11,20-trione 21-acetate

1. To a solution of 3.7 g. of 6α,7α-epoxy-17α,21-dihydroxy-4-pregnene-3,11,20-trione 21-acetate in 250 ml. dioxane and 600 ml. methanol, add a solution of 12 g. sodium azide in 150 ml. water and 10 ml. acetic acid. Allow the reaction mixture to stand overnight at room temperature then pour into water and extract the aqueous mixture with chloroform. Dry the combined extracts over magnesium sulfate and evaporate the solvent to a residue comprising 6β-azido-7α,17α,21-trihydroxy-4-pregnene-3,11,20-trione 21-acetate; yield 3.9 g. Purify by crystallization from methylene chloride to give 3.04 g. of 6β-azido-7α,17α,21-trihydroxy-4-pregnene-3,11,20-trione 21-acetate.

$\alpha]_D^{26} + 123°$ (dioxane); $\lambda_{max}^{methanol}$ 231 m$\mu$ ($\epsilon = 12,975$)

2. Alternatively the compound of this example is prepared as follows. To a solution of 200 mg. of 6α,7α-epoxy-17α,21-dihydroxy-4-pregnene-3,11,20-trione 21-acetate in 40 ml. of methanol, add 400 mg. of sodium azide and a solution of 40 mg. boric acid in 5 ml. of water. Stir the mixture at 50° C. for 35 minutes, add 100 ml. of water, then extract with chloroform. Wash the combined chloroform extracts with water, dry over magnesium sulfate, then concentrate in vacuo to a residue comprising 6β-azido-7α,17α,21-trihydroxy-4-pregnene-3,11,20-trione 21-acetate which can be utilized without further purification in esterification procedure 1B immediately following.

B. 6β-Azido-7α,17α,21-trihydroxy-4-pregnene-3,11,20-trione7,21-diacetate

Add 14 ml. of acetic anhydride to a solution of 3.04 g. of 6β-azido-7α,17α,21-trihydroxy-4-pregnene-3,11,20-trione 21-acetate in 30 ml. of pyridine and allow the reaction mixture to stand at room temperature for 18 hours. Pour the reaction mixture into 400 ml. of water and stir for 20 minutes. Collect the insoluble fraction by filtration and dry in vacuo to yield 3.031 g. of product comprising 6β-azido-7α,17α,21-trihydroxy-4-pregnene-3,11,20-trione 7,21-diacetate.

$\alpha]_D^{26} + 89.2°$ (dioxane); $\lambda_{max}^{methanol}$ 229 m$\mu$ ($\epsilon = 12,470$)

C. 6-Azido-17α,21-dihydroxy-4,6-pregnadiene-3,11,20-trione 21-acetate

1. Add 1 g. of 6β-azido-7α,17α,21-trihydroxy-4-pregnene-3,11,20-trione 7,21-diacetate to a suspension of 1 g. of tetramethylammonium fluoride in 100 ml. of acetonitrile. Allow the reaction mixture to stand at 60° C. for 35 minutes, then distill the solvent in vacuo and dissolve the resultant residue in chloroform and pour the chloroform solution into water. Separate the aqueous layer from the organic solution layer and wash the organic solution with aqueous sodium bicarbonate. Dry the organic solution over magnesium sulfate and evaporate the solvent under a stream of nitrogen to obtain a residue comprising 6-azido-17α,21-dihydroxy-4,6-pregnadiene-3,11,20-trione 21-acetate. Purify by crystallization in methanol and isolation of the resultant crystallized product to obtain 511 mg. of 6-azido-17α,21-dihydroxy-4,6-pregnadiene-3,11,20-trione 21-acetate which crystallizes with a mole of water as solvent.

$$\alpha]_D^{26} + 300.7° \text{ (dioxane)}; \lambda_{max}^{methanol} 250 \text{ m}\mu \text{ }(\epsilon=13,176);$$
$$\lambda_{max}^{methanol} 294 \text{ m}\mu \text{ }(\epsilon=12,274)$$

Calcd. for $C_{23}H_{27}O_6N_3 \cdot H_2O$: $N_2 = 9.15\%$ Found: $N_2 = 9.07\%$ 2. Alternatively, above procedure 1Cl may be carried out at room temperature for 18 hours (rather than at 60° C. for 35 minutes) and there is formed 6-azido-17α,21-dihydroxy-4,6-pregnadiene-3,11,20-trione 21-acetate.

3. Alternatively, the compound of this example is prepared as follows. Dissolve 4 g. of tetramethylammonium fluoride pentahydrate in 200 ml. of acetonitrile and evaporate in vacuo to a residue. Repeat this procedure once again. To the resulting dry residue comprising tetramethylammonium fluoride add 2 g. of 6β-azido-7α,17α,21-trihydroxy-4-pregnene-3,11,20-trione 7,21-diacetate in 100 ml. of acetonitrile. Stir the reaction mixture under an atmosphere of argon at 25° C for 2 hours. Distill the solvent in vacuo to a residue comprising 6-azido-17α-dihydroxy-4,6-pregnadiene-3,11,20-trione 21-acetate. Purify by chromatographing on Florisil (prewashed with hexane) eluting the product with acetone. Evaporate the combined eluates, then crystallize the resultant residue with methanol, to obtain 6-azido-17α,21-dihydroxy-4,6-pregnadiene-3,11,20-trione 21-acetate (i.e. 6-azido-6-dehydrocortisone 21-acetate).

4. Alternatively the compound of this example is prepared utilizing tetramethylammonium fluoride pentahydrate rather than with anhydrous tetramethylammonium fluoride in a manner such as the following. Add 2 g. of tetramethylammonium fluoride pentahydrate to 200 ml. of acetonitrile and heat the mixture with stirring until the tetramethylammonium fluoride pentahydrate liquefies. Cool to 25° C. under an atmosphere of nitrogen then add 2 g. of 6β-azido-7α,17α,21-trihydroxy-4-pregnene-3,11,20-trione 7,21-diacetate and stir the reaction mixture under an atmosphere of nitrogen at 25° C. for 3 hours. Concentrate the reaction mixture to about 100 ml. in vacuo at 25° C. then pour into 1 liter of water and extract the aqueous mixture with ten 100 ml. portions of dichloromethane. Wash the combined dichloromethane extracts with two 50 ml. portions of water, dry the dichloromethane over magnesium sulfate then evaporate in vacuo to a residue, triturate the residue with about 25 ml. of boiling ether, cool to −20° C. and filter the solid fraction comprising 6-azido-17α,21-dihydroxy-4,6-pregnadiene-3,11,20-trione 21-acetate. Purify by crystallization in methanol to obtain 6-azido-7α,21-dihydroxy-4,6-pregnadiene-3,11,20-trione 21-acetate which crystallizes with a mole of water as solvent:

$$\alpha]_D^{26} + 300.7° \text{ (dioxane)}$$

Alternatively, the compound of this example is prepared from 6β-azido-7α,17α,21-trihydroxy-4-pregnene-3,11,20-trione 21-acetate (compound of Example 1A) according to the following procedures D and E.

D. 6β-Azido-7α,17α,21-trihydroxy-4-pregnene-3,11,20-trione 7-methanesulfonate 21-acetate To a solution of 3 g. of 6β-azido-7α,17α,21-trihydroxy-4-pregnene-3,11,20-trione 21-acetate in 30 ml. of pyridine add 1.5 ml. of methanesulfonyl chloride and allow the reaction mixture to stand at room temperature for 17 hours. Pour the reaction mixture into water and collect by filtration the resultant precipitate comprising 6β-azido-7α, 17α,21-trihydroxy-4-pregnene-3,11,20-trione 7-methanesulfonate 21-acetate. Purify by drying the precipitate in vacuo and crystallizing from ether.

In the above procedure, by utilizing 2.2 ml. of p-toluenesulfonyl chloride in place of the 1.5 ml. of methanesulfonyl chloride there is obtained the corresponding 7-p-toluenesulfonate ester, i.e. 6β-azido-7α,17α,21-trihydroxy-4-pregnene-3,11,20-trione 7-p-toluenesulfonate 21-acetate.

E. 6-Azido-4,6-pregnadiene-17α,21-diol-3,11,20-trione 21-acetate

Add 1.5 g. of 6β-azido-7α,17α,21-trihydroxy-4-pregnene-3,11,20-trione 7-methanesulfonate 21-acetate to a suspension of 0.750 g. of tetramethylammonium fluoride in 150 ml. acetonitrile. Warm the reaction mixture at 60° C. for 35 minutes then remove the solvent in vacuo. Dissolve the resultant residue in chloroform and pour into water. Separate the solvent layers and wash the organic layer with aqueous sodium bicarbonate, then dry the organic layer over magnesium sulfate and evaporate the solvent to a residue comprising 6-azido-4,6-pregnadiene-17α,21-diol-3,11,20-trione 21-acetate. Purify by separation on preparative silica gel plates. Further purify by crystallizing the isolated product with methanol to obtain 6-azido-4,6-pregnadiene-17α,21-diol-3,11,20-trione 21-acetate.

Similarly, treat 6β-azido-7α,17α,21-trihydroxy-4-pregnene-3,11,20trione 7p-toluenesulfonate 21-acetate with tetramethylammonium fluoride in acetonitrile in the above described manner to obtain 6-azido-4,6-pregnadiene-17α,21-diol-3,11,20-trione 21-acetate.

In a manner similar to that described hereinabove, treat each of the following 6α,7α-oxido steroids with sodium azide in the manner of Example 1A:

6α,7α-Oxido-16α-methyl-4-pregnene-17α,21-diol-3,11,20-trione21-acetate,

6α,7α-Oxido-16β-methyl-4-pregnene-17α,21-diol-3,11,20-trione21-acetate,

6α,7α-Oxido-16-methylene-4-pregnene-17α,21-diol-3,11,20-trione21-acetate,

6α,7α-Oxido-16-fluoromethylene-4-pregnene-17α,21-diol-3,11,20-trione 21-acetate, 1α-Methyl-6α,7α-oxido-16α-acetoxy-4-pregnene-17α,21-diol-3,11,20-trione 21-acetate.

Isolate and purify the resultant products in a manner similar to that described in Example 1A to obtain, respectively:

6β-Azido-7α-hydroxy-16α-methyl-4-pregnene-17α,21-diol-3,11,20-trione 21-acetate, 6β-Azido-7α-hydroxy-16β-methyl-4-pregnene-17α,21-diol-3,11,20-trione 21-acetate, 6β-Azido-7α-hydroxy-16-methylene-4-pregnene-17α,21-diol-3,11,20-trione 21-acetate, 6β-Azido-7α-hydroxy-16-fluoromethylene-4-pregnene-17α,21-diol-3,11,20-trione 21-acetate, 1α-Methyl-6β-azido-7α-hydroxy-16α-acetoxy-4-pregnene-17α,21-diol-3,11,20-trione 21-acetate.

Esterify the 7α-hydroxy function in each of the foregoing products according to the procedure of Example 1B then treat each of the resultant 6β-azido-7α-acetoxy intermediates with tetramethylammonium fluoride in acetonitrile according to the procedure of Example 1C to obtain, respectively:

6-Azido-16α-methyl-4,6-pregnadiene-17α,21-diol-3,11,20-trione 21-acetate,

6-Azido-16β-methyl-4,6-pregnadiene-17α,21-diol-3,11,20-trione 21-acetate,

6-Azido-16-methylene-4,6-pregnadiene-17α,21-diol-3,11,20-trione 21-acetate,

6-Azido-16-fluoromethylene-4,6-pregnadiene-17α,21-diol-3,11,20-trione 21-acetate, 1α-Methyl-6-azido-16α-acetoxy-4,6-pregnadiene-17α,21-diol-3,11,20-trione 21 acetate.

EXAMPLE 2

6-Azido-4,6-pregnadiene-11β,17α,21-triol-3,20-dione 21-acetate (6-Azido-6-dehydro-hydrocortisone 21-acetate)

A. 6α,7α-Oxido-11β,17α,21-trihydroxy-4-pregnene-3,20-dione 21-acetate

1. To a solution of 2 g. of 11β,17α,21-trihydroxy-4,6-pregnadiene-3,20-dione 21-acetate in 75 ml. of acetone add 2 g. of m-chloroperbenzoic acid over a period of 2.5 hours. Heat the reaction mixture at reflux temperature for 5 hours, distill the solvent, dissolve the resultant residue in methylene chloride and pour the methylene chloride solution into water.

Separate the aqueous layer from the organic solution, wash the organic solution with 200 ml. of 0.2 N-sodium hydroxide. Dry the organic solution over magnesium sulfate and remove the solvent in vacuo to a residue comprising 6α,7α-epoxy-11β,17α,21-trihydroxy-4-pregnene-3,20-dione 21-acetate. Purify by dissolving in methylene chloride and separating via preparative thin layer chromatography to obtain 460 mg. of 6α,7α-oxido-11β,17α,21-trihydroxy-4-pregnene-3,20-dione 21-acetate which is used without further purification in the following Example 2B.

2. Alternatively the compound of this example is prepared by treating 11β,17α,21-trihydroxy-4,6-pregnadiene-3,20-dione 21-acetate (7g.) with monoperphthalic acid (2.7 g.) in chloroform (700 ml.) at room temperature for 60 hours and isolating the resultant product by washing the chloroform solution successively with aqueous sodium bicarbonate, water, ferrous sulfate solution and again with water. Dry the chloroform solution over magnesium sulfate and distill the solvent to a residue comprising 6α,7α-oxido-11β,17α,21-trihydroxy-4-pregnene-3,20-dione 21-acetate. Purify by crystallization from acetone, m.p. 270° C.

3. Alternatively, the compound of this example is prepared according to Procedure 2A1 but using as solvent 80 ml. of methylene chloride/tert.-butanol (1:1) (rather than acetone) and carrying out the reaction at reflux temperature for hours to obtain 6α,7α-oxido-11β,17α,21-trihydroxy-4-pregnene-3,20-dione 21-acetate.

B. 6β-Azido-7α,11β,17α,21-tetrahydroxy-4-pregnene-3,20-dione 21-acetate

To a solution of 450 mg. of 6α,7α-oxido-11β,17α,21-trihydroxy-4-pregnene-3,20-dione 21-acetate in 20 ml. of dioxane and 60 ml. of methanol add a solution of 1.3 g. sodium azide in 15 ml. water and 1 ml. acetic acid. Allow the reaction mixture to stand at room temperature for 6 days then pour the reaction mixture into water and extract with chloroform. Dry the chloroform solution over magnesium sulfate and evaporate the solvent to a residue comprising 6β-azido-7α,11β,17α,21-tetrahydroxy-4-pregnene-3,20-dione 21-acetate. Purify by dissolving in methylene chloride and separating via thick layer chromatography to obtain 250 mg. of 6β-azido-7α,11β,17α,21-tetrahydroxy-4-pregnene-3,20-dione 21-acetate which is used without further purification in the following Example 2C.

C. 6β-Azido-7α,11β,17α,21-tetrahydroxy-4-pregnene-3,20-dione 7,21-diacetate

In a manner similar to that described in Example 1B, treat 6β-azido-7α,11β,17α,21-tetrahydroxy-4-pregnene-3,20-dione 21-acetate with acetic anhydride in pyridine at room temperature for 24 hours. Isolate the resultant product in a manner similar to that described in Example 1B to obtain 6β-azido-7α,11β,17α-tetrahydroxy-4-pregnene-3,20-dione 7,21-diacetate.

D. 6-Azido-11β,17α,21-trihydroxy-4,6-pregnadiene-3,20-dione 21-acetate

To a solution of 300 mg. tetramethylammonium fluoride in 15 ml. acetonitrile add a solution of 150 mg. of 6β-azido-7α,11β,17α-tetrahydroxy-4-pregnene-3,20-dione 7,21-diacetate in 15 ml. of acetonitrile. Allow the reaction mixture to stand at 60° C. for 40 minutes then remove the solvent in vacuo, dissolve the resultant residue in methylene chloride, pour the methylene chloride solution into water, separate the aqueous layer from the organic layer and wash the organic layer in aqueous sodium bicarbonate solution. Dry the organic layer over magnesium sulfate and remove the solvent in vacuo to a residue comprising 6-azido-11β,17α,21-trihydroxy-4,6-pregnadiene-3,20-dione 21-acetate. Purify via preparative thin layer chromatography utilizing silica gel to obtain 65 mg. of 6-azido-11β,17α,21-trihydroxy-4,6-pregnadiene-3,20-dione 21-acetate, $\lambda_{max}^{methanol}$ 351 mμ (ε = 12,452); $\lambda_{max}^{methanol}$ 299 mμ (ε = 12,452);

δ (CDCl₃), 0.73, 1.31, 2.15, 3.38, 4.66, 5.13, 5.78, 6.12 p.p.m.

In a manner similar to that described in Example 2A–2D, treat each of the following 4,6-pregnadienes with m-chloroperbenzoic acid in acetone according to the procedure of Example 2A;

9α-Fluoro-4,6-pregnadiene-11β,17α,21-triol-3,20-dione,
16α-Methyl-4,6-pregnadiene-11β,17α,21-triol-3,20-dione 21-acetate,
16β-Methyl-4,6-pregnadiene-11β,17α,21-triol-3,20-dione 21-acetate, 9α-Fluoro-16α-methyl-4,6-pregnadiene-11β,17α,21-triol-3,20-dione 21-acetate,
9α-Fluoro-16β-methyl-4,6-pregnadiene-11β,17α,21-triol-3,20-dione 21-acetate,
9α,11β-Dichloro-16α,17α-isopropylidenedioxy-4,6-pregnadiene-11β,21-diol-3,20-dione 21-acetate,
9α-Fluoro-16-methylene-4,6-pregnadiene-11β,17α,21-triol-3,20-dione 21-acetate,
whereby is obtained the following 6α,7α-oxido derivatives, respectively:

6α,7α-Oxido-9α-fluoro-4-pregnene-11β,17α,21-triol-3,20-dione,
6α,7α-Oxido-16α-methyl-4-pregnene-11β,17α,21-triol-3,20-dione 21-acetate,
6α,7α-Oxido-16β-methyl-4-pregnene-11β,17α,21-triol-3,20-dione 21-acetate,
6α,7α-Oxido-9α-fluoro-16α-methyl-4-pregnene-11β,17α,213,20-dione 21-acetate,
6α,7α-Oxido-9α-fluoro-16β-methyl-4-pregnene-11β,17α,213,20-dione 21-acetate,
6α,7α-Oxido-9α,11β-dichloro-16α,17α-isopropylidenedioxy-4-pregnene-11β,21-diol-3,20-dione 21-acetate,
6α,7α-Oxido-9α-fluoro-16-methylene-4-pregnene-11β,17α,21-triol-3,20-dione 21-acetate.

Treat each of the 6α,7α-oxido-4-pregnenes with sodium azide in a manner similar to that described in Example 2B to obtain the following 6β-azido-7α-hydroxy derivatives, respectively:

6β-Azido-7α-hydroxy-9α-fluoro-4-pregnene-11β,17α,21-triol-3,20-dione,
6β-Azido-7α-hydroxy-16α-methyl-4-pregnene-11β,17α,21-triol-3,20-dione 21-acetate,
6β-Azido-7α-hydroxy-16β-methyl-4-pregnene-11β,17α,21-triol-3,20-dione 21-acetate,
6β-Azido-7α-hydroxy-9α-fluoro-16α-methyl-4-pregnene-11β,17α,21-triol-3,20-dione 21-acetate,
6β-Azido-7α-hydroxy-9α-fluoro-16β-methyl-4-pregnene-11β,17α,21-triol-3,20-dione 21-acetate,
6β-Azido-7α-hydroxy-9α,11β-dichloro-16α,17α-isopropylidenedioxy-4-pregnene-11β,21-diol-3,20-dione 21-acetate,
6β-Azido-7α-hydroxy-9α-fluoro-16-methylene-4-pregnene-11β,17α,213,20-dione 21-acetate.

Esterify each of the above listed 6β-azido-7α-hydroxy derivatives with acetic anhydride in pyridine according to the procedure of Example 1B to obtain, respectively 6β-Azido-7α-acetoxy-9α-fluoro-4-pregnene-11β,17α,21-triol-3,20-dione,
6β-Azido-7α-acetoxy-16α-methyl-4-pregnene-11β,17α,21-triol-3,20-dione 21-acetate,
6β-Azido-7α-acetoxy-16α-methyl-4-pregnene-11β,17α,21-triol-3,20-dione 21-acetate,
6β-Azido-7α-acetoxy-9α-fluoro-16α-methyl-4-pregnene-11β,17α,21-triol-3,20-dione 21-acetate,
6β-Azido-7α-acetoxy-9α-fluoro-16β-methyl-4-pregnene-11β,17α,21-triol-3,20-dione 21-acetate,
6β-Azido-7α-acetoxy-9α,11β-dichloro-16α,17α-isopropylidenedioxy-4-pregnene-11β,21-diol-3,20-dione 21-acetate,
6β-Azido-7α-acetoxy-9α-fluoro-16-methylene-4-pregnene-11β,17α,213,20-dione 21-acetate.

Treat each of the foregoing 6α-azido-7α-acetoxy-4-pregnenes with tetramethylammonium fluoride in acetonitrile according to the procedure of Example 2D to obtain, respectively:

6-Azido-9α-fluoro-4,6-pregnadiene-11β,17α,21-triol-3,20-dione,
6-Azido-9α-fluoro-4,6-pregnadiene-11β,17α,21-triol-3,20-dione, 6-Azido-16α-methyl-4,6-pregnadiene-11β,17α,21-triol-3,20-dione 21-acetate, 6-Azido-16β-methyl-4,6-pregnadiene-11β,17α,21-triol-3,20-dione 21-acetate, 6-Azido-9α-fluoro-16α-methyl-4,6-pregnadiene-11β,17α,21-triol-3,20-dione 21-acetate, 6-Azido-9α-fluoro-16β-methyl-4,6-pregnadiene-11β,17α,21-triol-3,20-dione 21-acetate, 6-Azido-9α,11β-dichloro-16α,17α-isopropylidenedioxy-4,6-pregnadiene-11β,21-diol-3,20-dione 21-acetate, 6-Azido-9α-fluoro-16-methylene-4,6-pregnadiene-11β,17α,213,20-dione 21-acetate.

EXAMPLE 3

6β-Azido-7α,17α,21-trihydroxy-4,9(11)-pregnadiene-3,20-dione 7,21-diacetate

A. 6β-Azido-7α,11α,17α,21-tetrahydroxy-4-pregnene-3,20-dione 11-p-toluenesulfonate 21-acetate In a manner similar to that described in Example 1A1 treat 6α,7α-oxido-11α,17α,21-trihydroxy-4-pregnene-3,20-dione 11-p-toluenesulfonate 21-acetate with sodium azide in dilute acetic acid at room temperature. Isolate and purify the resultant product in a manner similar to that described in Example 1A1 to obtain 6β-azido-7α,11α,17α,21-tetrahydroxy-4-pregnene-3,20-dione 11-p-toluenesulfonate 21-acetate.

B. 6β-Azido-7α,11α,17α,21-tetrahydroxy-4-pregnene-3,20-dione 7,21-diacetate 11-p-toluenesulfonate In a manner similar to that described in Example 1B treat 6β-azido-7α,11α,17α,21-tetrahydroxy-4-pregnene-3,20-dione 11-p-toluenesulfonate 21-acetate with acetic anhydride in pyridine. Isolate and purify the resultant product in a manner similar to that described in Example 1B to obtain 6β-azido-7α,11α,17α-tetrahydroxy-4-pregnene-3,20-dione 7,21-diacetate 11-p-toluenesulfonate.

C. 6β-Azido-7α,17α,21-trihydroxy-4,9(11)-pregnadiene-3,20-dione 7,21-diacetate

To a solution of 1.9 g. of anhydrous sodium acetate in 20 ml. of acetic acid at about 105° C. add 1 g. of 6β-azido-7α,11α,17α-tetrahydroxy-4-pregnene-3,20-dione 7,21-diacetate 11-p-toluenesulfonate. Heat the solution at reflux temperature for 40 minutes then chill in ice and dilute with cold water. Separate the resultant precipitate by filtration, wash with water, dry and crystallize from acetone-hexane to give 6β-azido-7α,17α,21-trihydroxy-4,9(11)-pregnadiene-3,20-dione 7,21-diacetate.

D. 6β-Azido-7α,17α,21-trihydroxy-9α,11β-dichloro-4-pregnene-3,20-dione 7,21-diacetate To 1.0 g. of 6β-azido-7α,17α,21-trihydroxy-4,9(11)-pregnadiene 7,21-diacetate dissolved in 35 ml. of methylene chloride at 20° C. add 2.1 ml. chlorine gas in carbon tetrachloride (65 mg. Cl₂/ml.) and 0.15 ml. of pyridine. Stir the reaction mixture at −20° C. for 20 minutes then allow the reaction mixture to warm to room temperature over 40 minutes. Filter the reaction mixture and concentrate the filtrate in vacuo to a residue comprising 6β-azido-7α,17α,21-trihydroxy-9α,11β-dichloro-4-pregnene-3,20-dione 7,21-diacetate.

E. 6-Azido-9α,11β-dichloro-4,6-pregnadiene-17α,21-diol-3,20-dione 21-acetate

In a manner similar to that described in Example 1C2 treat 6β-azido-7α,17α,21-trihydroxy-9α,11β-dichloro-4-pregnene-3,20-dione 7,21-diacetate with tetramethylammonium fluoride in acetonitrile at room temperature. Isolate and purify the resultant product in a manner similar to that described in Example 1C2 to obtain 6-azido-9α,11β-dichloro-4,6-pregnadiene-17α,21-diol-3,20-dione 21-acetate.

EXAMPLE 4

6-Azido-9α-halogeno-4,6-pregnadiene-11β,17α,21-triol-3,20-dione 21-acetate

A. 6β-Azido-7α,11β,17α,21-tetrahydroxy-9α-bromo-4-pregnene-3,20-dione 7,21-diacetate (6β-Azido-7α-acetoxy-9α-bromo-hydrocortisone 21-acetate)

To a mixture of 0.24 g. of 6β-azido-7α,17α,21-trihydroxy-4,9(11)-pregnadiene-3,20-dione 7,21-diacetate in 20 ml. of dioxane (which has been purified by refluxing over sodium followed by distillation) and 2 ml. of water, add 0.07 g. of N-bromoacetamide and 1 ml. of 1.5 N-perchloric acid. Allow the mixture to stand for 2 hours then add a solution of 0.2 g. of sodium sulfite in 2 ml. of water. Extract the reaction mixture with methylene chloride and wash the combined organic extracts with water then dry over magnesium sulfate and evaporate to a residue comprising 6β-azido-7α,11β,17α,21-tetrahydroxy-9α-bromo-4-pregnene-3,20-dione 7,21-diacetate. Purify by crystallization from acetone.

B. 6β-Azido-7α,17α,21-trihydroxy-9β,11β-oxido-4-pregnene-3,20-dione 7,21-diacetate To 0.25 g. of 6β-azido-7α,11β,17α,21-tetrahydroxy-9α-bromo-4-pregnene-3,20-dione 7,21-diacetate in 30 ml. of acetone add 0.3 g. of potassium acetate. Heat the reaction mixture at reflux temperature for 6 hours then distill the acetone and add water to the resultant residue. Filter the solid which separates and crystallize the solid from methanol-water to give 6β-azido-7α,17α,21-trihydroxy-9β,11β-oxido-4-pregnene-3,20-dione 7,21-diacetate.

C. 6β-Azido-7α,11β,17α,21-tetrahydroxy-9α-fluoro-4-pregnene-3,20-dione 7,21-diacetate To 3.5 g. of hydrogen fluoride in 20 ml. of chloroform and 0.6 ml. of tetrahydrofuran at −10° C. add 1.0 g. of 6β-azido-7α,17α,21-trihydroxy-9β,11β-oxido-4-pregnene-3,20-dione 7,21-diacetate. Keep the reaction mixture at −10° C. for 3 hours, then pour into aqueous sodium carbonate solution. Separate the organic solvent layer from the water and evaporate the organic solvent to a residue comprising 6β-azido-7α,11β,17α,21-tetrahydroxy-9α-fluoro-4-pregnene-3,20-dione 7,21-diacetate. Purify by crystallization from methanol.

In similar manner the 9α-chloro analog is prepared as follows:

Dissolve 0.2 g. of 6β-azido-7α,17α,21-trihydroxy-9β,11β-oxido-4-pregnene-3,20-dione 7,21-diacetate in 30 ml. of alcohol-free chloroform and cool the solution to 0° C. Saturate the solution at 0° C. with anhydrous hydrogen chloride and allow the reaction mixture to stand for 6 hours at 0° C. Distill the solvent in vacuo to a residue comprising 6β-azido-7α,11β,17α-tetrahydroxy-9α-chloro-4-pregnene-3,20-dione 7,21-diacetate. Purify by crystallization from acetone.

D. 6-Azido-9α-halogneo-4,6-pregnadiene-11β,17α,21-triol-3,20-dione 21-acetate (6-Azido-9α-halogeno-6-dehydro-hydrocortisone 21-acetate)

In a manner similar to that described in Example 1C2 treat each of

6β-Azido-7α,11β,17α,21-tetrahydroxy-9α-fluoro-4-pregnene-3,20-dione 7,21-diacetate, 6β-Azido-7α,11β,17α,21-tetrahydroxy-9α-chloro-4-pregnene-3,20-diacetate, and 6β-Azido-7α,11β17α,21-tetrahydroxy-9α-bromo-4-pregnene-3,20-dione 7,21-diacetate with tetramethylammonium fluoride in acetonitrile. Isolate and purify the resultant respective products in a manner similar to that described in Example 1C2 to obtain respectively, 6-Azido-9α-fluoro-4,6-pregnadiene-11β,17α,21-triol-3,20-dione 21-acetate, 6-Azido-9α-chloro-4,6-pregnadiene-11β,17α,21-triol-3,20-dione 21-acetate, and 6-Azido-9α-bromo-4,6-pregnadiene-11β,17α,21-triol-3,20-dione 21-acetate.

EXAMPLE 5

6-Azido-16-methylene-17α-acetoxy-4,6-pregnadiene-3,20-dione (6-Azido-16-methylene-17α-acetoxy-6-dehydro-progesterone)

A. 6β-Azido-7α-hydroxy-16-methylene-17α-acetoxy-4-pregnene-3,20-dione

1. Dissolve 4 g. of 6α,7α-oxido-16-methylene-17α-acetoxy-4-pregnene-3,20-dione in 700 ml. of methanol and add a solution of 8 g. of sodium azide in 240 ml. of water and 4 ml. of acetic acid. Allow the reaction mixture to stand at room temperature overnight then pour into 2 liters of water and extract with chloroform. Dry the combined chloroform extracts over magnesium sulfate, evaporate the solvent to a residue and triturate the residue with ether and filter the resultant solid comprising 6β-azido-7α-hydroxy-16-methylene-17α-acetoxy-4-pregnene-3,20-dione. Purify by crystallization from ethyl acetate-ether to obtain 6β-azido-7α-hydroxy-16-methylene-17α-acetoxy-4-pregnene-3,20-dione.

$[\alpha]_D^{26}$ −92.2° (dioxane); $\lambda_{max}^{methanol}$ 238 m$\mu$ ($\epsilon$=13,515)

In a similar manner treat each of 6α,7α-oxido-16-methylene-17α-propionoxy-4-pregnene-3,20-dione, 6α,7α-oxido-16-methylene-17α-n-butyroxy-4-pregnene-3,20-dione, and 6α,7α-oxido-16-methylene-17α-valeroxy-4-pregnene-3,20-dione with sodium azide in dilute acetic acid. Isolate and purify the resultant products in a manner similar to that described to obtain, respectively, 6β-azido-7α-hydroxy-16-methylene-17α-propionoxy-4-pregnene-3,20-dione,
6β-azido-7α-hydroxy-16-methylene-17α-n-butyroxy-4-pregnene-3,20-dione, and
6β-azido-7α-hydroxy-16-methylene-17α-valeroxy-4-pregnene-3,20-dione.

2. Alternatively the compound of this example is prepared as follows. To a solution of 200 mg. of 6α,7α-oxido-16-methylene-17α-acetoxy-4-pregnene-3,20-dione in 40 ml. of methanol add 400 mg. of sodium azide and a solution of 40 mg. boric acid in 5 ml. of water. Stir the mixture at 50° C. for 35 minutes, add 100 ml. of water than extract with chloroform. Wash the combined chloroform extracts with water, dry over magnesium sulfate, then concentrate in vacuo to a residue comprising 6β-azido-7α-hydroxy-16-methylene-17α-acetoxy-4-pregnene-3,20-dione which can be used without further purification in the esterification procedures of 5B immediately following.

B. 6β-Azido-7α-methanesulfonyloxy-16-methylene-17α-acetoxy-4-pregnene-3,20-dione 1. Add 1.5 ml. of methanesulfonyl chloride to a solution of 3 g. of 6β-azido-7α-hydroxy-16-methylene-17α-acetoxy-4-pregnene-3,20-dione in 30 ml. of pyridine. Allow the reaction mixture to stand at room temperature for 17 hours then pour into water. Collect the resultant precipitate by filtration and dry in vacuo to obtain 6β-azido-7α-methanesulfonyloxy-16-methylene-17α-acetoxy-4-pregnene-3,20-dione. Purify by crystallization from ether;

$[\alpha]_D^{26}$ = −110.6° (dioxane)

In the above procedure, by utilizing p-toluenesulfonyl chloride in place of methanesulfonyl chloride, there is obtained the corresponding 7-p-toluenesulfonate ester, i.e. 6β-azido-7α,17α-dihydroxy-4-pregnene-3,20-dione 7-p-toluenesulfonate 17-acetate.

2. Similarly, by carrying out the procedure described in paragraph 1 hereinabove, on each of the following:

6β-Azido-7α-hydroxy-16-methylene-17α-propionoxy-4-pregnene-3,20-dione,
6β-Azido-7α-hydroxy-16-methylene-17α-n-butyroxy-4-pregnene-3,20-dione, and
6β-Azido-7α-hydroxy-16-methylene-17α-valeroxy-4-pregnene-3,20-dione, there is obtained respectively, 6β-Azido-7α-methanesulfonyloxy-16-methylene-17α-propionoxy-4-pregnene-3,20-dione,
6β-Azido-7α-methanesulfonyloxy-16-methylene-17α-n-butyroxy-4-pregnene-3,20-dione, and
6β-Azido-7α-methanesulfonyloxy-16-methylene-17α-valeroxy-4-pregnene-3,20-dione.

C. 6-Azido-16-methylene-17α-acetoxy-4,6-pregnadiene-3,20-dione

1. Add 1.5 g. of 6β-azido-7α-methanesulfonyloxy-16-methylene-17α-acetoxy-4-pregnene-3,20-dione to a suspension of 0.750 g. of tetramethylammonium fluoride in 150 ml. of acetonitrile. Allow the reaction mixture to stand at 60° C. for 35 minutes then remove the solvent in vacuo. Dissolve the resultant residue in chloroform and pour into water. Separate the solvent layers and wash the organic solvent layer with aqueous sodium bicarbonate, dry over magnesium sulfate, and evaporate the solvent to a residue comprising 6-azido-16-methylene-17α-acetoxy-4,6-pregnadiene-3,20-dione. Purify by separation on preparative silica gel plates. Further purify by recrystallization from methanol to obtain 6-azido-16-methylene-17α-acetoxy-4,6-pregnadiene-3,20-dione;

$[\alpha]_D^{26}$ −63° (dioxane); $\lambda_{max.}^{methanol}$ 252 m$\mu$ ($\epsilon$=14,616);

$\lambda_{max.}^{methanol}$ 298 m$\mu$ ($\epsilon$=14,616)

2. Similarly, in the above procedure, by utilizing as starting compounds any one of the following:

6β-Azido-7α-p-toluenesulfonyloxy-16-methylene-17α-acetoxy-4-pregnene-3,20-dione,
6β-Azido-7α-methanesulfonyloxy-16-methylene-17α-propionoxy-4-pregnene-3,20-dione,
6β-Azido-7α-methanesulfonyloxy-16-methylene-17α-n-butyroxy-4-pregnene-3,20-dione, and
6β-Azido-7α-methanesulfonyloxy-16-methylene-17α-valeroxy-4-pregnene-3,20-dione, there is obtained, respectively, 6-Azido-16-methylene-17α-acetoxy-4,6-pregnadiene-3,20-dione,
6-Azido-16-methylene-17α-propionoxy-4,6-pregnadiene-3,20-dione,
6-Azido-16-methylene-17α-n-butyroxy-4,6-pregnadiene-3,20-dione, and
6-Azido-16-methylene-17α-valeroxy-4,6-pregnadiene-3,20-dione.

3. Alternatively the compound of this example is prepared utilizing tetramethylammonium fluoride in dimethylformamide as follows. To a suspension of 100 mg. of tetramethylammonium fluoride in 10 ml. dimethylformamide add 100 mg. 6β-azido- 7α-methanesulfonyloxy-16-methylene-17α-acetoxy-4-pregnene-3,20-dione. Allow the reaction mixture to stand at room temperature for 19 hours. Pour the reaction mixture into 175 ml. of water, add 5 g. sodium chloride, collect by filtration the resultant precipitate comprising 6-azido-16-methylene-17α-acetoxy-4,6-pregnadiene-3,20-dione and dry said precipitate at 45° C. in vacuo. Extract the filtrate with methylene chloride and evaporate the combined extracts to obtain additional 6-azido-16-methylene-17α-acetoxy-4,6-pregnadiene-3,20-dione. Purify by preparative silica gel plate chromatography.

4. Alternatively the compound of this example is prepared utilizing tetramethylammonium chloride as reagent as follows. To a suspension of 160 mg. of tetramethylammonium chloride in 15 ml. of acetonitrile add 130 mg. 6β-azido-7α-methanesulfonyloxy-16-methylene-17α-acetoxy-4-pregnene-3,20-dione. Allow the reaction mixture to stand at 60° C. for 26 hours then pour into 100 ml. of water and collect by filtration the resultant precipitate comprising 6-azido-16-methylene-17α-acetoxy-4,6-pregnadiene-3,20-dione. Purify by drying the precipitate at 45° C. in vacuo and separating via preparative thick layer chromatography; yield = 60 mg. (58% theoretical yield).

Alternatively the compound of this example is prepared according to the following procedures D. and E.

D. 6β-Azido-7α,17α-diacetoxy-16-methylene-4-pregnene-3,20-dione

Add 14 ml. of acetic anhydride to a solution of 300 mg. of 6β-azido-7α-hydroxy-16-methylene-17α-acetoxy-4-pregnene-3,20-dione in 30 ml. of pyridine and allow the reaction mixture to stand at room temperature for 18 hours. Pour the reaction mixture into 400 ml. of water and stir for 20 minutes. Collect the insoluble fraction by filtration and dry in vacuo to yield a product comprising 6β-azido-7α,17α-diacetoxy-16-methylene-4-pregnene-3,20-dione. Purify by crystallization from ethyl acetate; β]$_D$ —119.3° (methanol).

In similar manner, by utilizing as starting compound in the above procedure any one of the following, i.e.

6β-azido-7α-hydroxy-16-methylene-17α-propionoxy-4-pregnene-3,20-dione,

6β-Azido-7α-hydroxy-16-methylene-17α-n-butyroxy-4-pregnene-3,20-dione, and

6β-Azido-7α-hydroxy-16-methylene-17α-valeroxy-4-pregnene-3,20-dione, respectively, the corresponding 7α-acetate ester is obtained:

6β-Azido-7α-acetoxy-16-methylene-17α-propionoxy-4-pregnene-3,20-dione,

6β-Azido-7α-acetoxy-16-methylene-17α-n-butyroxy-4-pregnene-3,20-dione, and

6β-Azido-7α-acetoxy-16-methylene-17α-valeroxy-4-pregnene-3,20-dione.

E. 6-Azido-16-methylene-17α-acetoxy-4,6-pregnadiene-3,20-dione

1. In a manner similar to that described in Example 5C treat 6β-azido-7bya,17α-diacetoxy-16-methylene-4-pregnene-3,20-dione with tetramethylammonium fluoride in acetonitrile at 60° C. for 35 minutes. Isolate and purify the resultant product in a manner similar to that described to obtain 6-azido-16-methylene-17α-acetoxy-4,6-pregnadiene-3,20-dione.

In similar manner treat with tetramethylammonium fluoride in acetonitrile each of the following:

6β-Azido-7α-acetoxy-16-methylene-17α-propionoxy-4-pregnene-3,20-dione,

6β-Azido-7α-acetoxy-16-methylene-17α-n-butyroxy-4-pregnene-3,20-dione, and

6β-Azido-7α-acetoxy-16-methylene-17α-valeroxy-4-pregnene-3,20-dione to obtain, respectively, 6-Azido-16-methylene-17α-propionoxy-4,6-pregnadiene-3,20-dione, 6-Azido-16-methylene-16α-n-butyroxy-4,6-pregnadiene-3,20-dione, and 6-Azido-16-methylene-17α-valeroxy-4,6-pregnadiene-3,20-dione.

2. Alternatively, the above procedure 5E1 may be carried out at room temperature for 18 hours (rather than 60° C. for 35 minutes) and there is formed 6-azido-16-methylene-17α-acetoxy-4,6-pregnadiene-3,20-dione.

3. Alternatively, the compound of this example is prepared as follows. Dissolve 4 g. of tetramethylammonium fluoride pentahydrate in 200 ml. acetonitrile and evaporate in vacuo to a residue. Repeat this procedure once again. To the resultant dry residue comprising tetramethylammonium fluoride add 2.3 g. of 6β-azido-7α,17α-diacetoxy-4-pregnene-3,20-dione in 100 ml. of acetonitrile. Stir the reaction mixture under an atmosphere of argon at 25° C. for 2 hours. Distill the solvent in vacuo to a residue comprising 6-azido-16-methylene-17α-acetoxy-4,6-pregnadiene-3,20-dione. Purify by chromatographing on Florisil (pre-washed with hexane), eluting the product with acetone. Evaporate the combined eluants then crystallize the resultant residue with methanol to obtain 6-azido-16-methylene-17α-acetoxy-4,6-pregnadiene-3,20-dione.

4. Alternatively the compound of this example is prepared utilizing tetramethylammonium fluoride pentahydrate rather than the anhydrous reagent in the following manner. Add 2 g. of tetramethylammonium fluoride pentahydrate to 200 ml. of acetonitrile and heat the mixture with stirring until the tetramethylammonium fluoride pentahydrate liquifies. Cool to 25° C. under an atmosphere of nitrogen then add 2.2 g. of 6β-azido-7α,17α-diacetoxy-16-methylene-4-pregnene-3,20-dione and stir the reaction mixture under an atmosphere of nitrogen at 25° C. for 3 hours. Concentrate the reaction mixture to about 100 ml. in vacuo at 25° C. then pour into 1 liter of water and extract with ten 100 ml. portions of dichloromethane. Wash the combined extract with two 50 ml. portions of water, dry the dichloromethane over magnesium sulfate, then evaporate in vacuo to a residue. Triturate the residue with about 25 ml. of boiling ether, cool to —20° C. and filter the solid fraction comprising 6-azido-16-methylene-17α-acetoxy-4,6-pregnadiene-3,20-dione. Purify by crystallization from methanol.

EXAMPLE 6

Alternate Procedure for Preparation of 6-Azido-16-Methylene-17α-Hydroxy-4,6-Pregnadiene-3,20-Dione and the 17α-Acetate Thereof A. 6β-Azido-7α-hydroxy-16β-methyl-16α,17α-oxido-4-pregnene-3,20-dione To a solution of 8 g. of 6α,7α;16α,17α-bis-oxide-16β-methyl-4-pregnene-3,20-dione in 1,500 ml. of methanol add a solution of 20 g. sodium azide in 100 ml. of water. Allow the reaction mixture to stand at room temperature overnight then pour into water, extract with chloroform and dry the combined extracts over magnesium sulfate. Filter the chloroform solution and evaporate to a residue comprising 6β-azido-7α-hydroxy-16β-methyl-16α,17α-oxido-4-pregnene-3,20-dione. Purify by crystallization from ethyl acetate, m.p. 217° C. (dec.)

$\alpha]_D^{26} + 53.5°$ (dioxane)

B. 6β-Azido-7α,17α-diacetoxy-16-methylene-4-pregnene-3,20-dione

To a solution comprising 520 mg. of 6β-azido-7α-hydroxy-16β-methyl-16α,17α-oxido-4-pregnene-3,20-dione in 8 ml. of acetic acid and 80 mg. of p-toluenesulfonic acid cooled to 5° C. add 4 ml. of trifluoroacetic anhydride. Allow the reaction mixture to stand at room temperature for 25 minutes then pour into water and collect by filtration the resultant precipitate comprising 6β-azido-7α,17α-diacetoxy-16-methylene-4-pregnene-3,20-dione. Purify by drying the precipitate and crystallizing from ethyl acetate-ether to obtain 280 mg. of 6β-azido-7α,17α-diacetoxy-16-methylene-4-pregnene-3,20-dione;

$\alpha]_D^{26} - 119.3°$ (dioxane)

C. 6-Azido-16-methylene-17α-acetoxy-4,6-pregnadiene-3,20-dione

In a manner similar to that described in Example 5E1 treat 6β-azido-7α,17α-diacetoxy-16-methylene-4-pregnene-3,20-dione with tetramethylammonium fluoride in acetonitrile at 60° C. for 35 minutes. Isolate and purify the resultant product in the manner described to obtain 6-azido-16-methylene-17α-acetoxy-4,6-pregnadiene-3,20-dione.

The corresponding 6-azido-17α-hydroxy-4,6-pregnadiene is obtained via the 16β-methyl-16α,17α-oxido intermediate according to following procedures D., E., and F.

D. 6β-Azido-7α-methanesulfonyloxy-16β-methyl-16α,17α-oxido-4-pregnene-3,20-dione Add 0.75 ml. of methanesulfonyl chloride to a solution of 1.5 g. of 6β-azido-7α-hydroxy-16β-methyl-16α,17α-oxido-4-pregnene-3,20-dione in 15 ml. of pyridine. Allow the reaction mixture to stand at room temperature for 17 hours then pour into water and extract with methylene chloride, wash the combined methylene chloride extracts with dilute aqueous sodium bicarbonate solution then with water and dry over magnesium sulfate. Filter the methylene chloride solution and evaporate to a residue comprising 1.65 g. of 6β-azido-7α-methanesulfonyloxy-16β-methyl-16α,17α-oxido-4-pregnene-3,20-dione.

In the above procedure by utilizing p-toluenesulfonyl chloride instead of methanesulfonyl chloride, there is obtained the corresponding p-toluenesulfonate ester, i.e. 6β-azido-7α-p-toluenesulfonyloxy-16β-methyl-16α,17α-oxido-4-pregnene-3,20-dione.

E. 6β-Azido-7α-methanesulfonyloxy-16-methylene-17α-hydroxy-4-pregnene-3,20-dione To a solution of 0.8 g. of 6β-azido-7α-methanesulfonyloxy-16β-methyl-16α,17α-oxido-4-pregnene-3,20-dione in 17 ml. of acetic acid, at room temperature add 1.7 ml. of a 10 percent solution of hydrobromic acid in acetic acid. Allow the reaction mixture to stand at room temperature for 30 minutes then dilute with 2 liters of water. Extract with methylene chloride and wash the methylene chloride extracts with water and evaporate to a residue comprising 6β-azido-7α-methanesulfonyloxy-16-methylene-17α-hydroxy-4-pregnene-3,20-dione which is sued without further purification in following procedure F.

In similar manner, by treating 6β-azido-7α-p-toluenesulfonyloxy-16β-methyl-16α,17α-oxido-4-pregnene-3,20-dione with hydrobromic acid in acetic acid there is obtained 6β-azido-7α-p-toluenesulfonyloxy-16-methylene-17α-hydroxy-4-pregnene-3,20-dione.

F. 6-Azido-16-methylene-17α-hydroxy-4,6-pregnadiene-3,20-dione

In a manner similar to that described in Example 5C1 treat 6β-azido-7α-methanesulfonyloxy-16-methylene-17α-hydroxy-4-pregnene-3,20-dione with tetramethylammonium fluoride in acetonitrile. Isolate and purify the resultant product in a manner similar to that described to obtain 6-azido-16-methylene-17α-hydroxy-4,6-pregnadiene-3,20-dione.

In similar manner treat 6β-azido-7α-p-toluenesulfonyloxy-16-methylene-17α-hydroxy-4-pregnene-3,20-dione with tetramethylammonium fluoride in acetonitrile to obtain 6-azido-16-methylene-17α-hydroxy-4,6-pregnadiene-3,20-dione.

Alternatively, the 6-azido-16-methylene-17α-hydroxy-4,6-pregnadiene of this example is prepared according to following procedures 6G. and 6H.

G. 6-Azido-16β-methyl-16α,17α-oxido-4,6-pregnadiene-3,20-dione

In a manner similar to that described in Example 5E1 except that the reaction mixture is allowed to stand at 60° C. for 16 hours rather than 30 minutes, treat 6β-azido-7α-methanesulfonyloxy-16-methyl-16α,17α-oxido-4-pregnene-3,20-dione with tetramethylammonium fluoride in acetonitrile. Isolate the resultant product via preparative thin layer chromatographic techniques to obtain 6-azido-16β-methyl-16α,17α-oxido-4,6-pregnadiene-3,20-dione.

H. 6-Azido-16-methylene-17α-hydroxy-4,6-pregnadiene-3,20-dione

In a manner similar to that described in Example 6E treat 6-azido-16β-methyl-16α,17α-oxido-4,6-pregnadiene-3,20-dione with hydrobromic acid in acetic acid at room temperature for 30 minutes. Isolate and purify the resultant product in a manner similar to that described to obtain 6-azido-16-methylene-17α-hydroxy-4,6-pregnadiene-3,20-dione.

I. Another alternate method of preparing the 6-azido-17α-acetoxy-4,6-pregnadiene of Example 6C hereinabove is as follows:

In a manner similar to that described in Example 6B treat 6-azido-16β-methyl-16α,17α-oxido-4,6-pregnadiene-3,20-dione with acetic acid and p-toluenesulfonic acid together with trifluoroacetic anhydride. Isolate and purify the resultant product in a manner similar to that described in Example 6B to obtain 6-azido-16-methylene-17α-acetoxy-4,6-pregnadiene-3,20-dione.

EXAMPLE 7

6-Azido-4,6-androstadien-3,17-dione

A. 6β-Azido-7α-hydroxy-4-androstene-3,17-dione

To a solution of 1 g. of 6α,7α-oxido-4-androstene-3,17-dione in 100 ml. methanol add 4 g. of sodium azide in 20 ml. of water and 3 ml. of acetic acid. Allow the reaction mixture to stand at room temperature overnight. Extract the reaction mixture with methylene chloride and evaporate the combined methylene chloride extracts to a residue comprising 6β-azido-7α-hydroxy-4-androstene-3,17-dione. Purify by crystallization from ethyl acetate;

$$\alpha]_D^{26} + 95.3° \text{ (dioxane)}$$

B. 6β-Azido-7α-methanesulfonyloxy-4-androstene-3,17-dione

To a solution of 785 mg. 6β-azido-7α-hydroxy-4-androstene-3,17-dione in 6.5 ml. of pyridine add 0.4 ml. methanesulfonyl chloride. Allow the reaction mixture to stand at room temperature for 18 hours then pour into 250 ml. of water. Stir the mixture for 20 minutes then collect the insolubles by filtration and dry in vacuo to give 700 mg. of 6β-azido-7α-methanesulfonyloxy-4-androstene-3,17-dione. Purify via preparative thin layer chromatography $$\alpha]_D^{26} + 38.2° \text{ (dioxane)}$$

C. 6-Azido-4,6-androstadiene-3,17-dione

To a suspension of 500 mg. of tetramethylammonium fluoride in 50 ml. acetonitrile add 500 mg. of 6β-azido-7α-methanesulfonyloxy-4-androstene-3,17-dione. Allow the reaction mixture to stand 1 hour at room temperature then heat for 15 minutes at 60° C. Remove the solvent in vacuo then dissolve the resultant residue in methylene chloride and pour the methylene chloride solution into water. Wash the organic layer with aqueous sodium bicarbonate, dry over magnesium sulfate and evaporate the solvent in vacuo to a residue comprising 6-azido-4,6-androstadiene-3,17-dione. Purify via preparative thin layer chromatography followed by crystallization from methanol $$\alpha]_D^{26} + 206.6° \text{ (dioxane)}$$

Alternatively, the compound of this example is prepared according to following procedures 7D. and 7E.

D. 6β-Azido-7α-acetoxy-4-androstene-3,17-dione

To a solution of 1.63 g. 6β-azido-7α-hydroxy-4-androstene-3,17-dione in 25 ml. of pyridine add 2.5 ml. acetic anhydride. Allow the reaction mixture to stand at room temperature for 42 hours then pour the reaction mixture into 500 ml. of water. Stir for 1 hour then collect the resultant precipitate by filtration and dry the precipitate at 45° C. in vacuo to obtain 1.65 g. of 6β-axido-7α-acetoxy-4-androstene-3,17-dione. Purify by crystallization from methanol, $$\alpha]_D^{26} + 47.2° \text{ (dioxane)}$$

E. 6-Azido-4,6-androstadiene-3,17-dione

In a manner similar to that described in Example 1C treat 6β-azido-7α-acetoxy-4-andorstene-3,17-dione with tetramethylammonium fluoride in acetonitrile at 60° C. for 35 minutes to obtain 6-azido-4,6-androstadiene-3,17-dione.

In a manner similar to that described in Examples 7A, 7B and 7C treat each of the following 6α,7α-oxido-4-androstenes with sodium azide in methanol and water together with acetic acid:

6α,7α-Oxido-4-androstene-17β-ol-3-one 17-acetate,
6α,7α-Oxido-17α-methyl-4-androstene-17β-ol-3-one
6α,7α-Oxido-17α-ethinyl-4-androstene-17β-ol-3-one and
6α,7α-Oxido-17α-ethinyl-19-nor-4-androstene-17β-ol-3-one.

Isolate and purify the resultant respective products in a manner similar to that described to obtain, respectively, 6β-Azido-7α,17β-dihydroxy-4-androstene-3-one 17-acetate,
6β-Azido-7α,17β-dihydroxy-17α-methyl-4-androstene-3-one
6β-Azido-7α,17β-dihydroxy-17α-ethinyl-4-androstene-3-one
6β-Azido-7α,17β-dihydroxy-17α-ethinyl-19-nor-4-androstene-3-one.

Treat each of the foregoing 7α-hydroxy-4-androstenes with methanesulfonyl chloride in pyridine according to the procedure of Example 7B to obtain the corresponding 7α-methanesulfonate esters, respectively. Treatment of each of the 6β-azido-7α-methanesulfonyloxy-4-androstenes with tetramethylammonium fluoride in acetonitrile according to the procedure of Example 7C will yield, respectively:

6α-Azido-4,6-androstadiene-17β-ol-3-one 17 acetate,
6α-Azido-17α-methyl-4,6-androstadiene-17β-ol-3-one
6α-Azido-17α-ethinyl-4,6-androstadiene-17β-ol-3-one and 6α-Azido-17α-ethinyl-19-nor-4,6-androstadiene-17β-ol-3-one

EXAMPLE 8

6-Azido-4,6-cholestadiene-3-one

A. 6α,7α-Oxido-4-cholestene-3-one

In a manner similar to that described in Example 2A1 treat 4,6-cholestadiene-3-one with m-chloroperbenzoic acid in acetone. Isolate and purify the resultant product in a manner similar to that described to obtain 6α,7α-oxido-4-cholestene-3-one.

B. 6β-Azido-7α-hydroxy-4-cholestene-3-one

In a manner similar to that described in Example 2B treat 6α,7α-oxido-4-cholestene-3-one with sodium azide in aqueous methanol and acetic acid. Isolate and purify the resultant product in a manner similar to that described to obtain 6β-azido-7α-hydroxy-4-cholestene-3-one.

C. 6β-Azido-7α-acetoxy-4-cholestene-3-one

In a manner similar to that described in Example 2C treat 6β-azido-7α-hydroxy-4-cholestene-3-one with acetic anhydride in pyridine. Isolate and purify the resultant product in a manner similar to that described to obtain 6β-azido-7α-acetoxy-4cholestene-3-one.

D. 6-Azido-4,6-cholestadiene-3-one

In a manner similar to that described in Example 2D treat 6β-azido-7α-acetoxy-4-cholestene-3-one with tetramethylammonium fluoride in acetonitrile at 60° C. Isolate and purify the resultant product in a manner similar to that described to obtain 6-azido-4,6-cholestadiene-3-one.

We claim:

1. The process for the manufacture of 3-keto-6-azido-4,6-bis-dehydro-steroids which comprises treating a 3-keto-6β-azido-7α-acyloxy-4-dehydro-steroid which is saturated at C–1 and C–2 with a tetralkylammonium halide in an aprotic solvent.

2. The process according to claim 1 wherein said tetraalkylammonium halide is tetramethylammonium fluoride.

3. The process according to claim 1 wherein said 7α-acyloxy is a member selected from the group consisting of 7α-lower alkanoyloxy and 7α-hydrocarbonsulfonyloxy having up to seven carbon atoms.

4. The process according to claim 1 wherein said steroid is a steroid of the pregnane series which is saturated at C–1 and C–2; said 7α-acyloxy is a member selected from the group consisting of 7α-lower alkanoyloxy and 7α-hydrocarbonsulfonyloxy having up to seven carbon atoms; said tetraalkylammonium halide is tetramethylammonium fluoride; and said aprotic solvent is acetonitrile.

5. The process according to claim 4 wherein said 7α-acyloxy is a member selected from the group consisting of 7α-acetoxy and 7α-methanesulfonyloxy.

6. The process according to claim 1 wherein said 3-keto-6β-azido-7α-acyloxy-4-dehydro-steroid is a 21-unsubstituted-6β-azido-7α-acyloxy-4-pregnene-3,20-dione, said 7α-acyloxy being a member selected from the group consisting of 7α-lower alkanoyloxy and 7α-hydrocarbonsulfonyloxy having up to seven carbon atoms; said tetraalkylammonium halide is tetramethylammonium fluoride; and said aprotic solvent is acetonitrile; whereby is formed a 21-unsubstituted-6-azido-4,6-pregnadiene-3,20-dione.

7. The process according to claim 6 wherein said 21-unsubstituted-6β-azido-7α-acyloxy-4-pregnene-3,20-dione is a 6β-azido-7α-acyloxy-16-methylene-17α-lower alkanoyloxy-4-pregnene-3,20-dione wherein said 7α-acyloxy is a member selected from the group consisting of 7α-acetoxy and 7α-methanesulfonyloxy whereby is formed a 6-azido-16-methylene-17α-lower alkanoyloxy-4,6-pregnadiene-3,20-dione.

8. The process according to claim 7 wherein said 7α-acyloxy is 7α-acetoxy and said 17α-lower alkanoyloxy is 17α-acetoxy-, said process comprising treating 6β-azido-7α,17α-diacetoxy-16-methylene-4-pregnene-3,20-dione with tetramethylammonium fluoride in acetonitrile whereby is formed 6-azido-16-methylene-17α-acetoxy-4,6-pregnadiene-3,20-dione.

9. The process according to claim 1 wherein said 3-keto-6β-azido-7α-acyloxy-4-dehydro-steroid is a member selected from the group consisting of a 6β-azido-7α-acyloxy-4-pregnene-17α,21-diol-3,20-dione and the 21-lower alkanoates thereof, wherein said 7α-acyloxy is a member selected from the group consisting of 7α-lower alkanoyloxy- and 7α-hydrocarbonsulfonyloxy having up to seven carbon atoms; said tetraalkylammonium halide is tetramethylammonium fluoride; and said aprotic solvent is acetonitrile.

10. The process according to claim 9 wherein said 6β-azido-7α-acyloxy-4-pregnene-17α,21-diol-3,20-dione is 6β-azido-7α-acetoxy-4-pregnene-17α,21-diol-3,11,20-trione 21-acetate, said process comprising treating 6β-azido-7α-acetoxy-4-pregnene-17α,21-diol-3,11,20-trione 21-acetate with tetramethylammonium fluoride in acetonitrile, whereby is formed 6-azido-4,6-pregnadiene-17α,21-diol-3,11,20-trione 21-acetate.

* * * * *

PO-1050
(5/69)

UNITED STATES PATENT OFFICE
CERTIFICATE OF CORRECTION

Patent No. 3,665,017  Dated May 23, 1972

Inventor(s) George J. Teutsch and Elliot L. Shapiro

It is certified that error appears in the above-identified patent and that said Letters Patent are hereby corrected as shown below:

"Abstract" (last paragraph, line 3), "7αacetoxy" should read --7α-acetoxy--. "Abstract" (last paragraph, line 5), "7αmethanesulfonyloxy" should read --7α-methanesulfonyloxy--. Column 2, line 52, "62-chloropropionic" should read --β-chloropropionic--. Column 3, line 25, "6β-azido-7β" should read --6β-azido-7α- --. Column 4, line 17, "6α,7α-oxide" should read --6α,7α-oxido- --. Column 6, line 21, "11β,17α,213,20-" should read --11β, 17α,21-triol -3,20--. Column 6, lines 39-48, "6-Azido-16α-hydroxy-4,6-pregnadiene-17α,21-diol-3,11,20-trione, the 16, 21-diacetate ester thereof, and the 16α,-17α6-Azido-16α-hydroxy-4,6-pregnadiene-11β,17α,21-triol-3,20-dione, the 16,21-diacetate ester thereof, and the 16α,17α6Azido-9α-fluoro-16α-hydroxy-4,6-pregnadiene-17α,21-diol-3,11,20-trione, the 16,21-diacetate ester thereof, and the 16α,17α6-Azido-9α-fluoro-16α-hydroxy-4,6-pregnadiene-11β,17α,21-triol-3,20-dione, the 16,21-diacetate ester thereof, and the 16α,-17α-iso-propylidene thereof" should read --6-Azido-16α-hydroxy-4,6-pregnadiene-17α,21-diol-3,11,20-trione, the 16,21-diacetate ester thereof, and the 16α,17α-iso-propylidene derivative thereof, 6-Azido-16α-hydroxy-4,6-pregnadiene-11β,17α,21-triol-3,20-dione, the 16,21-diacetate ester thereof, and the 16α, 17α-iso-propylidene derivative thereof, 6-Azido-9α-fluoro-16α-hydroxy-4,6-pregnadiene-17α,21-diol-3,11,20-trione, the 16,21-diacetate ester thereof, and the 16α,17α-iso-propylidene thereof, 6-Azido-9α-fluoro-16α-hydroxy-4,6-pregnadiene-11β,17α,21-triol-3,20-dione, the 16,21-diacetate ester thereof, and the 16α, 17α-iso-propylidene thereof--. Column 6, line 76, "16α,17α21-acetate thereof" should read --16α,17α-iso-propylidene 21-acetate thereof--. Column 8, line 1, "17-acetoxy-4,6..." should read --17α-acetoxy-4,6...--. Column 8, line 33, "dhydroprogesterones" should read --dehydroprogesterones--. Column 8, line 54, "17ζ-acetoxy" should read --17α-acetoxy--. Column 8, line 65, "9α,21-difluro" should read --9α,21-difluoro--. Column 8, line 68, "16α-methyl analogs" should read --16β-methyl analogs--.

PO-1050
(5/69)

UNITED STATES PATENT OFFICE
CERTIFICATE OF CORRECTION

Patent No. 3,665,017     Dated May 23, 1972

Inventor(s) George J. Teutsch and Elliot L. Shapiro    - 2 -

It is certified that error appears in the above-identified patent and that said Letters Patent are hereby corrected as shown below:

Column 8, line 71, "16α-methyl analogs" should read --16β-methyl analogs--. Column 8, line 72, "7-Azido" should read --6-Azido--. Column 9, line 22, "66-azido" should read --6-azido--. Column 9, line 49, "6-azido-16α-lower alkyl" should read --6-azido-17α-lower alkyl--. Column 11, line 24, "17α-dihydroxy" should read --17α,21-dihydroxy--. Column 12, line 18, "3,11,20trione 7p-" should read --3,11,20-trione 7-β- --. Column 13, line 52, "11β,17α-tetrahydroxy" should read --11β,17α,21-tetrahydroxy--. Column 13, lines 57 and 58, "7α,11β,17α-tetrahydroxy" should read --7α,11β,17α,21-tetrahydroxy--. Column 14, line 26, "11β,17α,213,20-dione" should read --11β,17α,21,triol-3,20-dione--. Column 14, line 28, "11β,17α,213,20-dione" should read --11β,17α,21,triol-3,20-dione--. Column 14, line 50, "11β,17α,213,20-dione" should read --11β,17α,21-triol 3,20-dione--. Column 14, line 58, "16α-methyl" should read --16β-methyl--. Column 14, line 67, "11β,17α,213,3,20-dione" should read --11β,17α,21-triol 3,20-dione--. Column 14, lines 73 and 74, a compound is repeated and ought be deleted. Column 15, line 12, "11β,17α,213, 20-dione" should read --11β,17α,21-triol-3,20-dione--. Column 15, line 36, "7α,11α,17α" should read --7α,11α,17α,21- --. Column 15, line 42, "7α,11α,17α-" should read --7α,11α, 17α,21- --. Column 16, line 47, "7α,11β,17α-" should read --7α,11β,17α,21- --. Column 16, line 49, "9α-halogneo" should read --9α-halogeno--. Column 19, line 6, "B]$_D$" should read --A]$_D$--. Column 19, line 26, "6β-azido-7byα,17α-" should read --6β-azido-7α,17α- --. Column 20, line 17, "17α-bis-oxide-" should read --17α-bis-oxido- --. Column 21, line 10, "which is sued" should read --which is used--. Column 21, line 39, "16-methyl-16α,17α" should read --16β-methyl-16α,17α---. Column 22, line 38, "6β-axido-7α" should read --6β-azido-7α--.

Signed and sealed this 6th day of February 1973.

(SEAL)
Attest:

EDWARD M. FLETCHER, JR.
Attesting Officer

ROBERT GOTTSCHALK
Commissioner of Patents